US012561924B2

(12) United States Patent
Stern et al.

(10) Patent No.: US 12,561,924 B2
(45) Date of Patent: Feb. 24, 2026

(54) DISPLAYING EXTENDED REALITY MEDIA FEED USING MEDIA LINKS

(71) Applicant: Apple Inc., Cupertino, CA (US)

(72) Inventors: Matthew L. Stern, Hermosa Beach, CA (US); Omar R. Khan, San Ramon, CA (US); David Scott, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/882,622

(22) Filed: Sep. 11, 2024

(65) Prior Publication Data

US 2025/0111622 A1 Apr. 3, 2025

Related U.S. Application Data

(60) Provisional application No. 63/586,578, filed on Sep. 29, 2023.

(51) Int. Cl.
*G06T 17/00* (2006.01)
*G06F 3/01* (2006.01)
(Continued)

(52) U.S. Cl.
CPC ............ *G06T 19/006* (2013.01); *G06F 3/013* (2013.01); *G06F 3/017* (2013.01);
(Continued)

(58) Field of Classification Search
CPC ... G06T 19/006; G06T 2200/24; G06F 3/013; G06F 3/017; G06F 3/04815; G06F 3/04845
See application file for complete search history.

(56) References Cited

U.S. PATENT DOCUMENTS 8,730,156 B2 5/2014 Weising et al.
9,870,130 B2 1/2018 Schubert et al.
(Continued)

FOREIGN PATENT DOCUMENTS

DE 102016125811 A1 11/2017
DE 102020128536 A1 5/2021
(Continued)

OTHER PUBLICATIONS

Your PC in VR, Virtual Desktop [online]. Virtual Desktop, Inc., 2023 [retrieved on Apr. 14, 2024]. Retrieved from the Internet: <URL: https://www.vrdesktop.net/>, 4 pages.
(Continued)

*Primary Examiner* — Abdul-Samad A Adediran
(74) *Attorney, Agent, or Firm* — Kubota & Basol LLP

(57) ABSTRACT

Some examples of the disclosure are directed to systems and methods for communicating image sensor data to a computer system using one or more media links that allow for image sensor data to be displayed within a three-dimensional environment. In some examples, while presenting a three-dimensional environment that includes an electronic device that is communicatively coupled to an image sensor (e.g., a camera, or some other imaging device) within the three-dimensional environment, the electronic device utilizes a visual code displayed on the electronic device to establish a communication link with the image sensor receiving an indication to display image sensor data from the image sensor that is communicatively coupled to the electronic device. In some examples, while presenting a three-dimensional environment that includes a first pre-defined location within the three-dimensional environment, the electronic device facilitates the user to choose an image sensor to display at the pre-defined location.

24 Claims, 15 Drawing Sheets

(51) Int. Cl.

| | |
|---|---|
| *G06F 3/04815* | (2022.01) |
| *G06F 3/04845* | (2022.01) |
| *G06T 19/00* | (2011.01) |

(52) U.S. Cl.

CPC ...... *G06F 3/04815* (2013.01); *G06F 3/04845* (2013.01); *G06T 2200/24* (2013.01)

(56) References Cited

U.S. PATENT DOCUMENTS

| | | | |
|---|---|---|---|
| 10,139,985 | B2 | 11/2018 | Mildrew et al. |
| 10,163,198 | B2 | 12/2018 | Rochford et al. |
| 10,186,086 | B2 | 1/2019 | Giraldi et al. |
| 10,331,205 | B2 | 6/2019 | Kim et al. |
| 10,540,005 | B2 | 1/2020 | Yoon et al. |
| 10,564,714 | B2 | 2/2020 | Marggraff et al. |
| 10,565,761 | B2 | 2/2020 | Deluca et al. |
| 10,708,965 | B1 | 7/2020 | Subramanian et al. |
| 10,877,645 | B2 | 12/2020 | Lee et al. |
| 11,023,035 | B1 | 6/2021 | Atlas et al. |
| 11,132,840 | B2 | 9/2021 | Sarangdhar et al. |
| 11,176,755 | B1 | 11/2021 | Tichenor et al. |
| 11,243,734 | B2 | 2/2022 | Boissière et al. |
| 11,379,033 | B2 | 7/2022 | O'hern et al. |
| 11,500,510 | B2 | 11/2022 | Tokuchi et al. |
| 11,730,226 | B2 | 8/2023 | Stolarz et al. |
| 11,842,454 | B1 | 12/2023 | Lin et al. |
| 11,861,056 | B2 | 1/2024 | Burns et al. |
| 11,868,582 | B2 | 1/2024 | Kim et al. |
| 11,875,162 | B2 | 1/2024 | Garstenauer et al. |
| 11,948,263 | B1 | 4/2024 | Rudman et al. |
| 11,972,092 | B2 | 4/2024 | Zurmoehle et al. |
| 12,020,387 | B2 | 6/2024 | Maharaja |
| 12,182,325 | B2 | 12/2024 | Calderone et al. |
| 12,254,127 | B2 | 3/2025 | Burns et al. |
| 12,321,515 | B2 | 6/2025 | Calderone et al. |
| 12,408,804 | B2 | 9/2025 | Schneider et al. |
| 2010/0293504 | A1 | 11/2010 | Hachiya |
| 2013/0167092 | A1 | 6/2013 | Yu et al. |
| 2013/0207963 | A1 | 8/2013 | Stirbu et al. |
| 2013/0249922 | A1 | 9/2013 | Hachiya |
| 2014/0002444 | A1 | 1/2014 | Bennett et al. |
| 2014/0181683 | A1 | 6/2014 | Lim et al. |
| 2015/0193982 | A1 | 7/2015 | Mihelich et al. |
| 2016/0025971 | A1 | 1/2016 | Crow et al. |
| 2016/0363774 | A1 | 12/2016 | Kawasima |
| 2016/0370858 | A1 | 12/2016 | LeppÄnen et al. |
| 2017/0061694 | A1 | 3/2017 | Giraldi et al. |
| 2017/0090566 | A1 | 3/2017 | George-Svahn et al. |
| 2017/0115728 | A1 | 4/2017 | Park et al. |
| 2017/0154326 | A1 | 6/2017 | Jo et al. |
| 2017/0169616 | A1 | 6/2017 | Wiley et al. |
| 2018/0077383 | A1 | 3/2018 | Akao et al. |
| 2018/0084287 | A1 | 3/2018 | Shimura |
| 2018/0095542 | A1 | 4/2018 | Mallinson |
| 2018/0300952 | A1 | 10/2018 | Evans et al. |
| 2018/0350119 | A1 | 12/2018 | Kocharlakota et al. |
| 2019/0188918 | A1 | 6/2019 | Brewer et al. |
| 2019/0228503 | A1 | 7/2019 | Tokuchi |
| 2019/0302977 | A1 | 10/2019 | Pendergast et al. |
| 2019/0332250 | A1 | 10/2019 | Lee et al. |
| 2019/0362560 | A1 | 11/2019 | Choi et al. |
| 2019/0369569 | A1 | 12/2019 | Olsen et al. |
| 2020/0038120 | A1 | 2/2020 | Ziraknejad et al. |
| 2020/0051527 | A1 | 2/2020 | Ngo |
| 2020/0112711 | A1 | 4/2020 | Enriquez et al. |
| 2020/0201444 | A1 | 6/2020 | Stoyles et al. |
| 2020/0257484 | A1 | 8/2020 | Qian et al. |
| 2020/0319704 | A1 | 10/2020 | Kathuria et al. |
| 2020/0328913 | A1 | 10/2020 | Wyas et al. |
| 2020/0412862 | A1 | 12/2020 | Oh et al. |
| 2021/0011556 | A1 | 1/2021 | Atlas et al. |
| 2021/0055789 | A1 | 2/2021 | Tsai et al. |
| 2021/0067418 | A1 | 3/2021 | Ely et al. |
| 2021/0142552 | A1 | 5/2021 | Kimura et al. |
| 2021/0158624 | A1 | 5/2021 | Moon et al. |
| 2021/0173536 | A1 | 6/2021 | Kondo |
| 2021/0227601 | A1 | 7/2021 | Eom et al. |
| 2021/0279957 | A1 | 9/2021 | Eder et al. |
| 2021/0287439 | A1 | 9/2021 | Goodrich et al. |
| 2021/0312713 | A1 | 10/2021 | Peri et al. |
| 2021/0326094 | A1 | 10/2021 | Buerli et al. |
| 2021/0331069 | A1 | 10/2021 | Gustafson et al. |
| 2021/0358294 | A1 | 11/2021 | Parashar et al. |
| 2021/0366440 | A1 | 11/2021 | Burns et al. |
| 2021/0400744 | A1 | 12/2021 | Chen et al. |
| 2021/0405760 | A1 | 12/2021 | Schoen |
| 2022/0086205 | A1 | 3/2022 | Lebeau et al. |
| 2022/0124286 | A1 | 4/2022 | Punwani et al. |
| 2022/0179503 | A1 | 6/2022 | Timonen et al. |
| 2022/0239718 | A1 | 7/2022 | Song et al. |
| 2022/0244536 | A1 | 8/2022 | Sha et al. |
| 2022/0253125 | A1 | 8/2022 | Wallen et al. |
| 2022/0287676 | A1 | 9/2022 | Steines et al. |
| 2022/0291808 | A1 | 9/2022 | Stevens et al. |
| 2022/0303680 | A1 | 9/2022 | Ahmed et al. |
| 2022/0391158 | A1 | 12/2022 | Lemmens et al. |
| 2023/0120052 | A1 | 4/2023 | Wallen et al. |
| 2023/0176806 | A1 | 6/2023 | Chen et al. |
| 2023/0341932 | A1 | 10/2023 | Silva et al. |
| 2023/0351702 | A1 | 11/2023 | Tan et al. |
| 2023/0353398 | A1 | 11/2023 | White |
| 2023/0368475 | A1 | 11/2023 | Chan et al. |
| 2023/0400958 | A1 | 12/2023 | Morrison et al. |
| 2024/0103685 | A1 | 3/2024 | Pazmino et al. |
| 2024/0103686 | A1 | 3/2024 | Pazmino et al. |
| 2024/0104870 | A1 | 3/2024 | Fuste Lleixa et al. |
| 2024/0126362 | A1 | 4/2024 | Burns et al. |
| 2024/0135612 | A1 | 4/2024 | Hold-geoffroy et al. |
| 2024/0185514 | A1* | 6/2024 | Singh ..................... G06F 3/013 |
| 2024/0273838 | A1 | 8/2024 | Palangie et al. |
| 2024/0361832 | A1 | 10/2024 | Calderone et al. |
| 2024/0361833 | A1 | 10/2024 | Calderone et al. |
| 2025/0005864 | A1 | 1/2025 | Dessero et al. |
| 2025/0111626 | A1 | 4/2025 | Deliz Centeno et al. |
| 2025/0165069 | A1 | 5/2025 | Calderone et al. |
| 2025/0348186 | A1 | 11/2025 | Krivoruchko |
| 2025/0350902 | A1 | 11/2025 | Keatch et al. |
| 2025/0356596 | A1 | 11/2025 | O'Leary et al. |

FOREIGN PATENT DOCUMENTS

| | | | |
|---|---|---|---|
| EP | 2458486 | A1 | 5/2012 |
| EP | 4155867 | A1 | 3/2023 |
| JP | 2022175629 | A | 11/2022 |
| JP | 2023052278 | A | 4/2023 |
| WO | 2018090060 | A1 | 5/2018 |
| WO | 2021061349 | A1 | 4/2021 |
| WO | 2022208797 | A1 | 10/2022 |

OTHER PUBLICATIONS

Huang et al., "Proxy-Based Security Audit System for Remote Desktop Access", Computer Communications And Networks, ICCCN 2009. Proceedings of 18th International Conference On, IEEE, Piscataway, NJ, USA, Aug. 3, 2009, 5 pages.

Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.

Non-Final Office Action received for U.S. Appl. No. 17/934,104, mailed on Nov. 14, 2025, 30 pages.

Non-Final Office Action received for U.S. Appl. No. 18/587,739, mailed on Sep. 16, 2025, 34 pages.

Corrected Notice of Allowability received for U.S. Appl. No. 18/919,095, mailed on Nov. 12, 2025, 5 pages.

International Search Report received for PCT Patent Application No. PCT/US2025/032533, mailed on Oct. 30, 2025, 6 pages.

Notice of Allowance received for U.S Appl. No. 18/473,182, mailed on Apr. 23, 2025, 8 pages.

Notice of Allowance received for U.S Appl. No. 18/473,182, mailed on Oct. 21, 2025, 8 pages.

(56) References Cited

OTHER PUBLICATIONS

Notice of Allowance received for U.S Appl. No. 18/473,179, mailed on Oct. 6, 2025, 8 pages.

Notice of Allowance received for U.S Appl. No. 18/473,179, mailed on May 8, 2025, 9 pages.

Drawing and Painting in VR by Using a Graphics Tablet as Virtual Paper, Reddit [online]. Reddit, Aug. 1, 2012. Available online at <https://www.reddit.com/r/oculus/comments/1wsdlv/drawing_and_painting_in_vr_by_using_a_graphics/>, [Retrieved from Internet on Nov. 18, 2025], 6 pages.

Extended European Search Report received for European Patent Application No. 24171800.6, mailed on Sep. 5, 2024, 15 pages.

Extended European Search Report received for European Patent Application No. 24171804.8, mailed on Sep. 5, 2024, 13 pages.

International Search Report received for PCT Patent Application No. PCT/US2024/030661, mailed on Nov. 4, 2024, 5 pages.

Non-Final Office Action received for U.S. Appl. No. 18/429,301, mailed on Jun. 12, 2024, 28 pages.

Notice of Allowance received for U.S. Appl. No. 18/429,294, mailed on Jun. 21, 2024, 10 pages.

Notice of Allowance received for U.S. Appl. No. 18/429,294, mailed on Oct. 31, 2024, 10 pages.

Notice of Allowance received for U.S. Appl. No. 18/429,301, mailed on Nov. 22, 2024, 8 pages.

You Can Bring Your Real Phone With You Into VR!, YouTube [online]. YouTube, Mar. 28, 2023. Available online at <https://www.youtube.com/watch?v=2niOsrGVUq8>, [Retrieved from Internet on Nov. 18, 2025], 2 pages.

* cited by examiner

Device
201

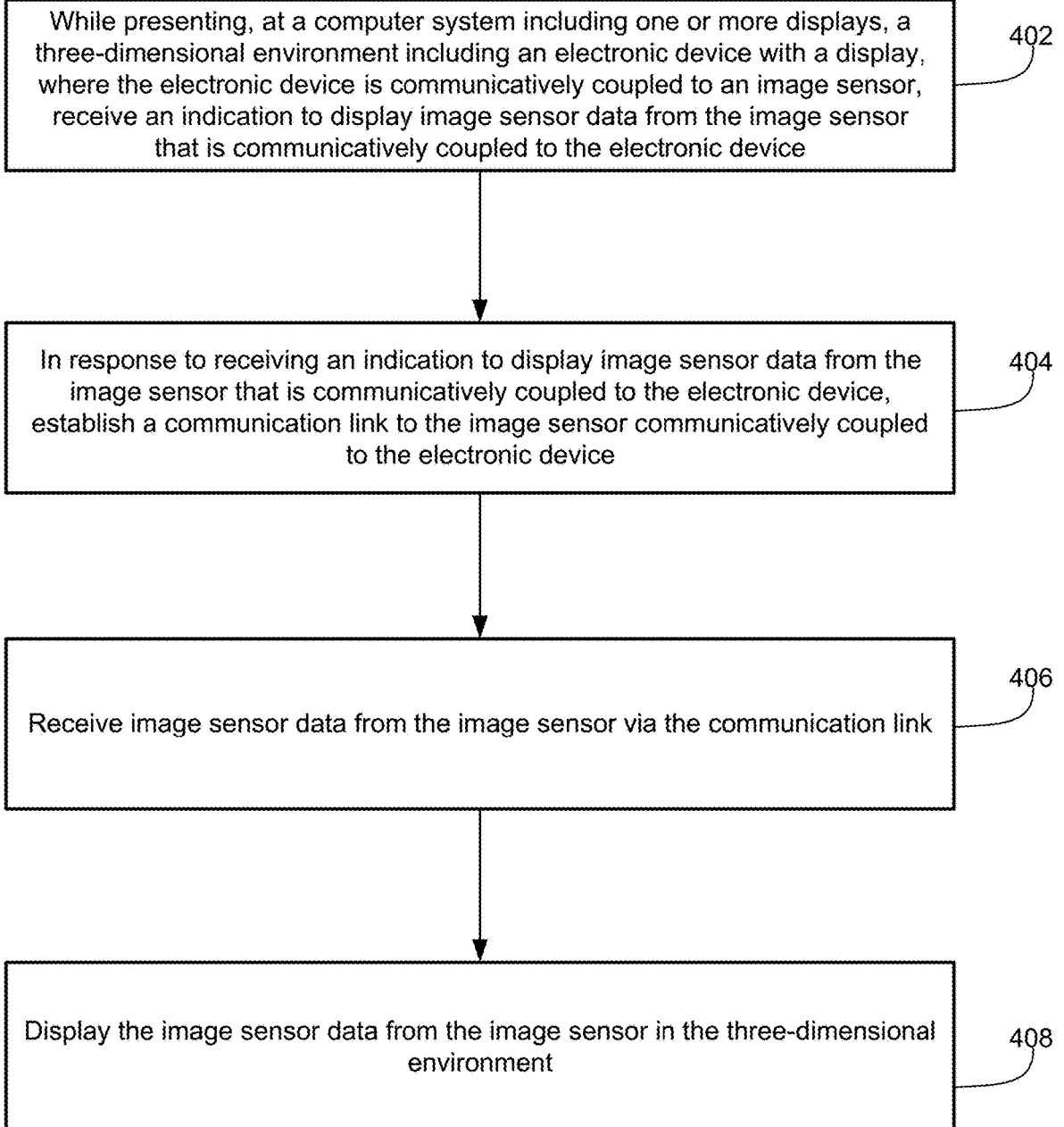

While presenting, at a computer system including one or more displays, a three-dimensional environment including an electronic device with a display, where the electronic device is communicatively coupled to an image sensor, receive an indication to display image sensor data from the image sensor that is communicatively coupled to the electronic device — 402

In response to receiving an indication to display image sensor data from the image sensor that is communicatively coupled to the electronic device, establish a communication link to the image sensor communicatively coupled to the electronic device — 404

Receive image sensor data from the image sensor via the communication link — 406

Display the image sensor data from the image sensor in the three-dimensional environment — 408

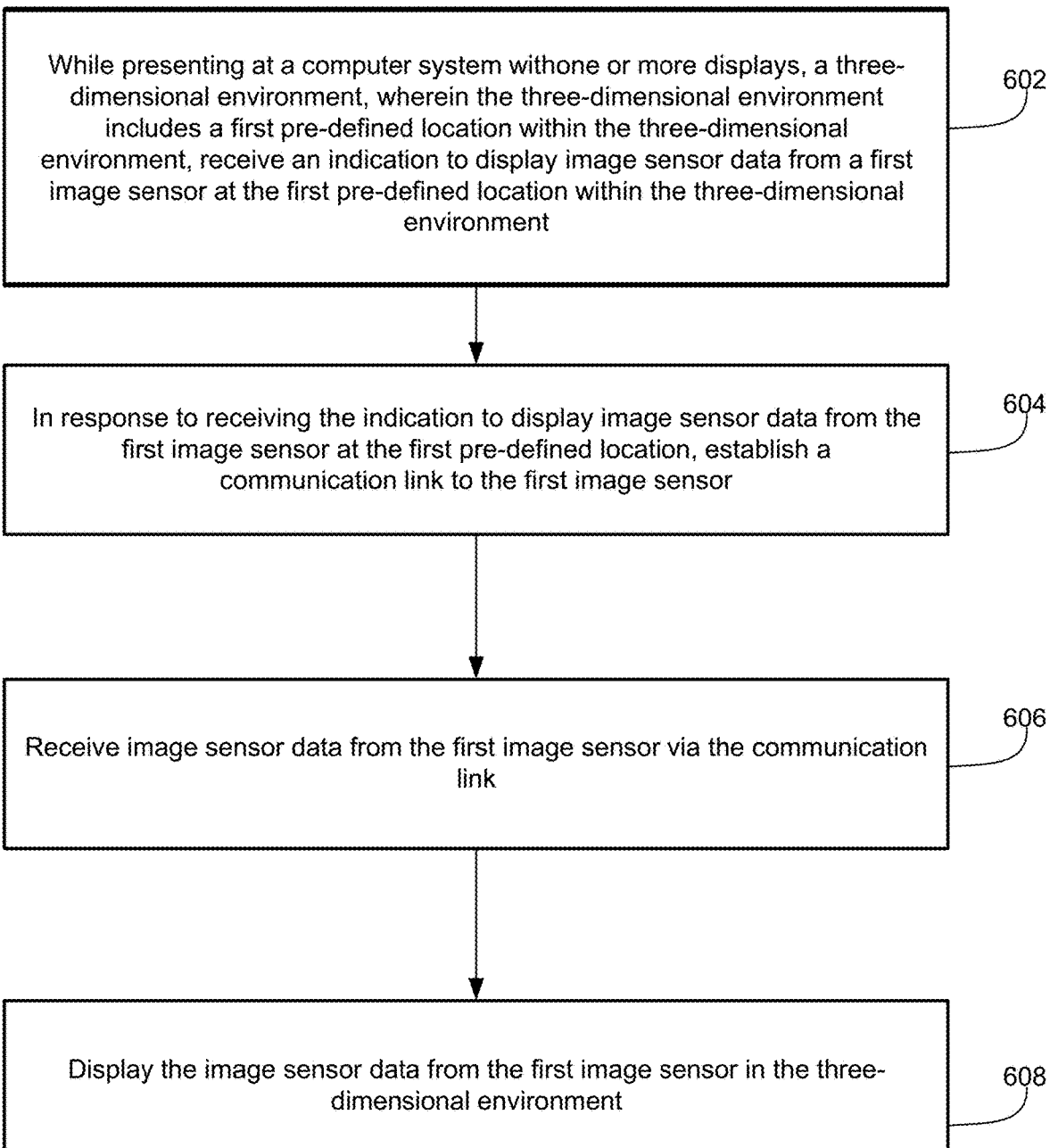

While presenting at a computer system withone or more displays, a three-dimensional environment, wherein the three-dimensional environment includes a first pre-defined location within the three-dimensional environment, receive an indication to display image sensor data from a first image sensor at the first pre-defined location within the three-dimensional environment

602

In response to receiving the indication to display image sensor data from the first image sensor at the first pre-defined location, establish a communication link to the first image sensor

604

Receive image sensor data from the first image sensor via the communication link

606

Display the image sensor data from the first image sensor in the three-dimensional environment

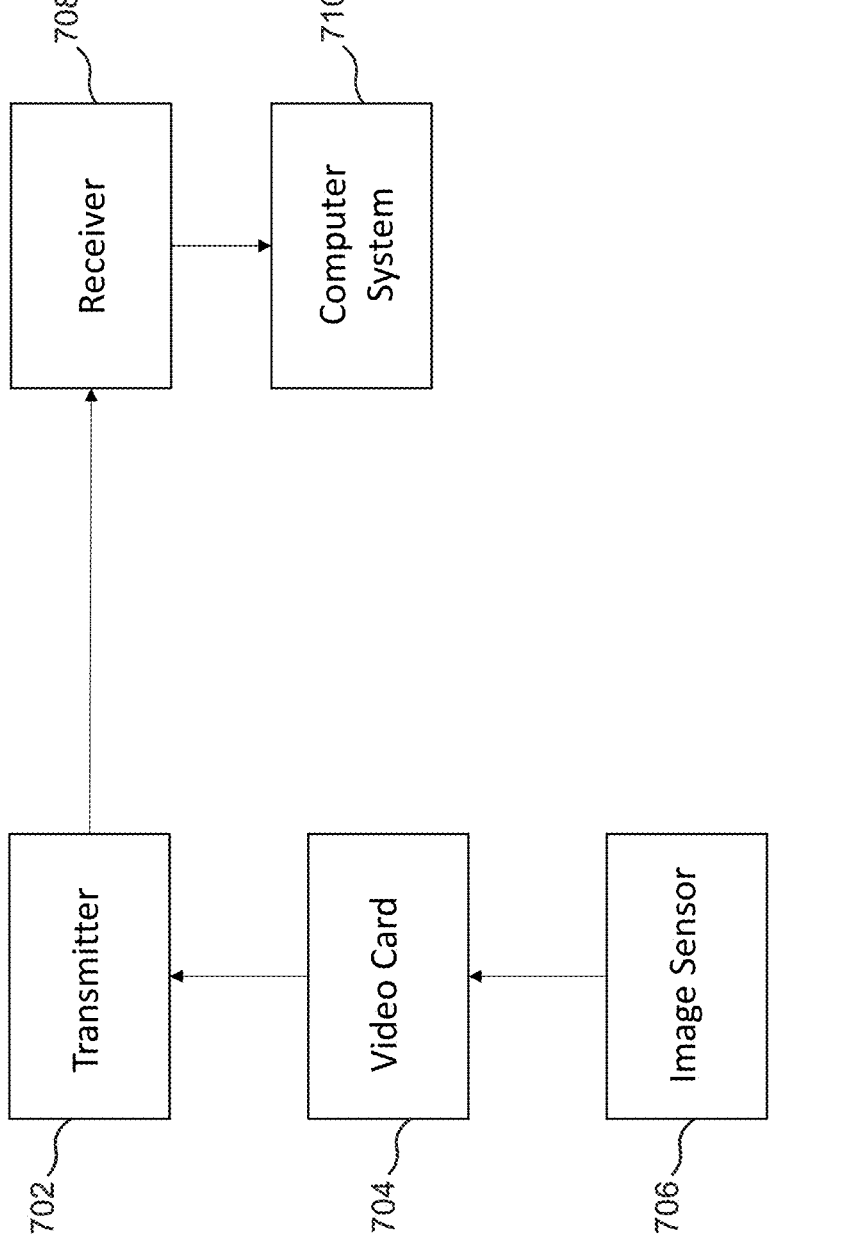
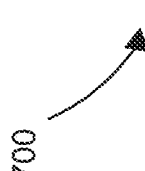
FIG. 7

DISPLAYING EXTENDED REALITY MEDIA FEED USING MEDIA LINKS

CROSS-REFERENCE TO RELATED APPLICATIONS

This application claims the benefit of U.S. Provisional Application No. 63/586,578, filed Sep. 29, 2023, the entire disclosure of which is herein incorporated by reference for all purposes.

FIELD OF THE DISCLOSURE

This relates generally to media links for displaying image sensor data within a three-dimensional environment.

BACKGROUND OF THE DISCLOSURE

Some electronic devices include cameras configured to capture images and/or video. Some electronic devices including one or more cameras are wired to a display to enable viewing of the camera feed.

SUMMARY OF THE DISCLOSURE

Some examples of the disclosure are directed to systems and methods for communicating image sensor data (e.g., a media feed from a media sensor) to a computer system using one or more media links that allow for image sensor data to be displayed within a three-dimensional environment (e.g., a user viewing the three-dimensional environment and using a computer system views image sensor data within the three-dimensional environment using one or more displays of the computer system rather than viewing the image sensor data that is being displayed on another electronic device that is visible within the three dimensional environment). In one or more examples of the disclosure, the systems and methods include, while presenting a three-dimensional environment that includes an electronic device that is communicatively coupled to an image sensor (e.g., a camera, or some other imaging device) within the three-dimensional environment, receiving an indication to display image sensor data from the image sensor that is communicatively coupled to the electronic device. In one or more examples, the indication can be received in the form of a visual code that is displayed on the electronic device that visible within the three-dimensional environment. In some examples, the user of the computer system selects the visual code (e.g., by gazing at the visual code and/or providing an input to select the visual code). In response to selection of the visual code, the computer system establishes a communication link with the image sensor, communicates the image sensor data via the communication link, and then displays the image sensor data within the three-dimensional environment. In this way, rather than viewing the image sensor data displayed on the display of the electronic device, the user instead can view the image sensor feed using one or more displays of the computer system, which leads to better image fidelity. In one or more examples, the visual code can include internet protocol (IP) information and screen resolution information that is used to establish the communications link with the image sensor, is used to transmit the image sensor data and/or is used to display the image sensor data within the three-dimensional environment.

In one or more examples, the image sensor data is initially anchored (e.g., displayed at) a location within the three-dimensional environment corresponding to the location of the visual code or of the electronic device that displayed the visual code. In some examples, the user of the computer system can move the location at which to anchor the display of the image sensor data. In one or more examples, the updated location can be stored as the initial anchor location for the corresponding image sensor and image sensor data feed. Additionally or alternatively, the user of the computer system can move the location of the displayed image sensor data (e.g., change the position and/or orientation) within the three-dimensional environment. Additionally or alternatively, the user can resize the display of the image sensor data within the three-dimensional environment (e.g., make the display of the image sensor data smaller or bigger within the three-dimensional environment).

In one or more examples, the systems and methods include, while presenting a three-dimensional environment that includes a first pre-defined location within the three-dimensional environment, receiving an indication to display image sensor data within the three-dimensional environment. In some examples, the indication is provided in the form of the user of the computer system providing input to the computer system at an image sensor connection user interface to initiate display of image sensor data. In one or more examples, the input at the image sensor connect user interface includes selecting an image sensor data feed from a list of image sensor data feeds displayed on the image sensor connection user interface. In one or more examples, and in response to receiving a selection of the image sensor data feed, the computer system establishes a communication link with the image sensor and begins receiving image sensor data directly or indirectly from the image sensor. In some examples, the computer system displays the image sensor data at the pre-defined location within the three-dimensional environment. Similar to the examples above, in some examples, the user is able to move the displayed image sensor data within the three-dimensional environment (e.g., change the location and/or within the three-dimensional environment where the image sensor data is displayed) and/or is able to resize the displayed image sensor data. In some examples of the disclosure, the pre-defined location within the three-dimensional environment is associated with an electronic display that is visible in the three-dimensional environment. In some examples, the image sensor data can be initially displayed on the location of the three-dimensional environment where the electronic display is located within the three-dimensional environment.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIG. 4 illustrates an example flow diagram illustrating a method of displaying image sensor data in a three-dimensional environment according to examples of the disclosure.

FIG. 6 illustrates an example flow diagram illustrating a method of displaying image sensor data in a three-dimensional environment according to examples of the disclosure.

FIG. 7 illustrates an example communication link between an image sensor and a computer system according to some examples of the disclosure.

DETAILED DESCRIPTION

Figure 1:
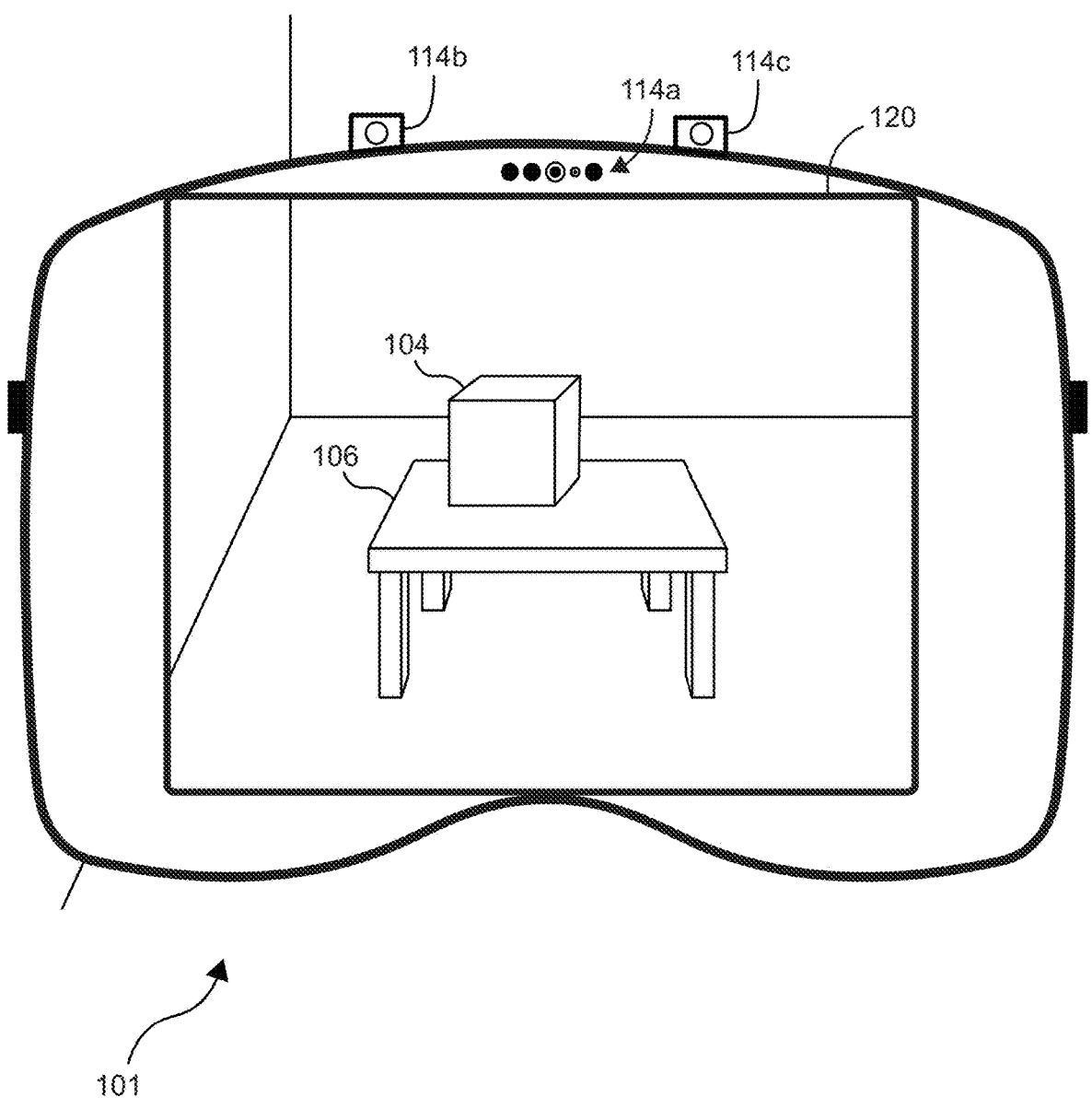
FIG. 1 illustrates an electronic device presenting an extended reality environment according to some examples of the disclosure.

Some examples of the disclosure are directed to systems and methods for communicating image sensor data (e.g., a media feed from a media sensor) to a computer system using one or more media links that allow for image sensor data to be displayed within a three-dimensional environment (e.g., a user viewing the three-dimensional environment on a computer system views image sensor data from one or more displays of the computer system rather than viewing the image sensor data that is being displayed on another electronic device that is visible within the three dimensional environment). In one or more examples of the disclosure, the systems and methods include, while presenting a three-dimensional environment that includes an electronic device that is communicatively coupled to an image sensor (e.g., a camera, or some other imaging device) within the three-dimensional environment, receiving an indication to display image sensor data from the image sensor that is communicatively coupled to the electronic device. In one or more examples, the indication can be received in the form of a visual code that is displayed on the electronic device that visible within the three-dimensional environment. In some examples, the user of the computer system selects the visual code (e.g., by gazing at the visual code and/or providing an input to select the visual code). In response to selection of the visual code, the computer system establishes a communication link with the image sensor, communicates the image sensor data via the communication link, and then displays the image sensor data within the three-dimensional environment. In this way, rather than viewing the image sensor data displayed on the display of the electronic device, the user instead can view the image sensor feed using one or more displays of the computer system, which leads to better image fidelity. In one or more examples, the visual code can include internet protocol (IP) information and screen resolution information that is used to establish the communications link with the image sensor, is used to transmit the image sensor data and/or is used to display the image sensor data within the three-dimensional environment.

In one or more examples, the image sensor data is initially anchored (e.g., displayed at) a location within the three-dimensional environment corresponding to the location of the visual code or of the electronic device that displayed the visual code. In some examples, the user of the computer system can move the location at which to anchor the display of the image sensor data. In one or more examples, the updated location can be stored as the initial anchor location for the corresponding image sensor and image sensor data feed. Additionally or alternatively, the user of the computer system can move the location of the displayed image sensor data (e.g., change the position and/or orientation) within the three-dimensional environment. Additionally or alternatively, the user can resize the display of the image sensor data within the three-dimensional environment (e.g., make the display of the image sensor data smaller or bigger within the three-dimensional environment).

In one or more examples, the systems and methods include, while presenting a three-dimensional environment that includes a first pre-defined location within the three-dimensional environment, receiving an indication to display image sensor data within the three-dimensional environment. In some examples, the indication is provided in the form of the user of the computer system providing input to the computer system at an image sensor connection user interface to initiate display of image sensor data. In one or more examples, the input at the image sensor connect user interface includes selecting an image sensor data feed from a list of image sensor data feeds displayed on the image sensor connection user interface. In one or more examples, and in response to receiving a selection of the image sensor data feed, the computer system establishes a communication link with the image sensor and begins receiving image sensor data directly or indirectly from the image sensor. In some examples, the computer system displays the image sensor data at the pre-defined location within the three-dimensional environment. Similar to the examples above, in some examples, the user is able to move the displayed image sensor data within the three-dimensional environment (e.g., change the location and/or within the three-dimensional environment where the image sensor data is displayed) and/or is able to resize the displayed image sensor data. In some examples of the disclosure, the pre-defined location within the three-dimensional environment is associated with an electronic display that is visible in the three-dimensional environment. In some examples, the image sensor data can be initially displayed on the location of the three-dimensional environment where the electronic display is located within the three-dimensional environment.

FIG. 1 illustrates a computer system 101 presenting an extended reality (XR) environment (e.g., a computer-generated environment optionally including representations of physical and/or virtual objects) according to some examples of the disclosure. In some examples, as shown in FIG. 1, computer system 101 is a head-mounted display or other head-mountable device configured to be worn on a head of a user of the computer system 101. Examples of computer system 101 are described below with reference to the architecture block diagram of FIG. 2. As shown in FIG. 1, computer system 101 and table 106 are located in a physical environment. The physical environment may include physical features such as a physical surface (e.g., floor, walls) or a physical object (e.g., table, lamp, etc.). In some examples, computer system 101 may be configured to detect and/or capture images of physical environment including table 106 (illustrated in the field of view of computer system 101).

In some examples, as shown in FIG. 1, computer system 101 includes one or more internal image sensors 114*a* oriented towards a face of the user (e.g., eye tracking cameras described below with reference to FIG. 2). In some examples, internal image sensors 114*a* are used for eye tracking (e.g., detecting a gaze of the user). Internal image sensors 114*a* are optionally arranged on the left and right portions of display 120 to enable eye tracking of the user's left and right eyes. In some examples, computer system 101 also includes external image sensors 114*b* and 114*c* facing outwards from the user to detect and/or capture the physical environment of the computer system 101 and/or movements of the user's hands or other body parts.

In some examples, display 120 has a field of view visible to the user (e.g., that may or may not correspond to a field of view of external image sensors 114*b* and 114*c*). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, computer system 101 may be an optical see-through device in which display 120 is a transparent or translucent display through which portions of the physical environment may be directly viewed. In some examples, display 120 may be included within a transparent lens and may overlap all or only a portion of the transparent lens. In other examples, computer system may be a video-passthrough device in which display 120 is an opaque display configured to display images of the physical environment captured by external image sensors 114*b* and 114*c*.

In some examples, in response to a trigger, the computer system 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the computer system 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the computer system as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the computer system. In some examples, objects displayed in the three-dimensional environment may be moved and/or reoriented in the three-dimensional environment in accordance with movement input detected via the input device.

In the discussion that follows, a computer system that is in communication with a display generation component and one or more input devices is described. It should be understood that the computer system optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described computer system, display and touch-sensitive surface are optionally distributed amongst two or more devices. Therefore, as used in this disclosure, information displayed on the computer system or by the computer system is optionally used to describe information outputted by the computer system for display on a separate display device (touch-sensitive or not). Similarly, as used in this disclosure, input received on the computer system (e.g., touch input received on a touch-sensitive surface of the computer system, or touch input received on the surface of a stylus) is optionally used to describe input received on a separate input device, from which the computer system receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
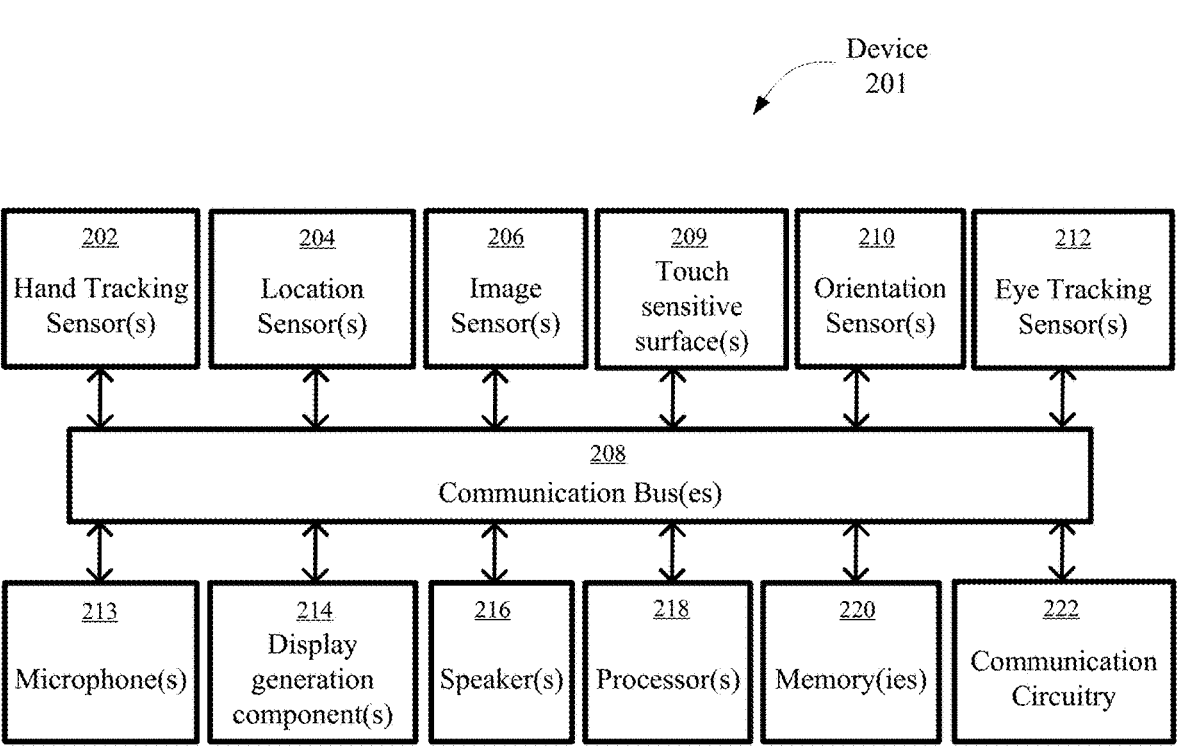
FIG. 2 illustrates a block diagram of an example architecture for a device according to some examples of the disclosure.

FIG. 2 illustrates a block diagram of an example architecture for a computer system device 201 according to some examples of the disclosure. In some examples, computer system 201 includes one or more computer systems. For example, the computer system 201 may be a portable device, an auxiliary device in communication with another device, a head-mounted display, etc., respectively. In some examples, computer system 201 corresponds to computer system 101 described above with reference to FIG. 1.

As illustrated in FIG. 2, the computer system 201 optionally includes various sensors, such as one or more hand tracking sensors 202, one or more location sensors 204, one or more image sensors 206 (optionally corresponding to internal image sensors 114*a* and/or external image sensors 114*b* and 114*c* in FIG. 1), one or more touch-sensitive surfaces 209, one or more motion and/or orientation sensors 210, one or more eye tracking sensors 212, one or more microphones 213 or other audio sensors, one or more body tracking sensors (e.g., torso and/or head tracking sensors), one or more display generation components 214, optionally corresponding to display 120 in FIG. 1, one or more speakers 216, one or more processors 218, one or more memories 220, and/or communication circuitry 222. One or more communication buses 208 are optionally used for communication between the above-mentioned components of computer systems 201.

Communication circuitry 222 optionally includes circuitry for communicating with computer systems, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component (s) 214 includes multiple displays. In some examples, display generation component(s) 214 can include a display with touch capability (e.g., a touch screen), a projector, a holographic projector, a retinal projector, a transparent or translucent display, etc. In some examples, computer system 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with computer system 201 or external to computer system 201 that is in communication with computer system 201).

Computer system 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from computer system 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment. In some examples, computer system 201 uses CCD sensors, event cameras, and depth sensors in combination to detect the physical environment around computer system 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, computer system 201 uses image sensor(s) 206 to detect the position and orientation of computer system 201 and/or display generation component(s) 214 in the real-world environment. For example, computer system 201 uses image sensor(s) 206 to track the position and orientation of display generation component(s) 214 relative to one or more fixed objects in the real-world environment.

In some examples, computer system 201 includes microphone(s) 213 or other audio sensors. Computer system 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Computer system 201 includes location sensor(s) 204 for detecting a location of computer system 201 and/or display generation component(s) 214. For example, location sensor(s) 204 can include a global positioning system (GPS) receiver that receives data from one or more satellites and allows computer system 201 to determine the device's absolute position in the physical world.

Computer system 201 includes orientation sensor(s) 210 for detecting orientation and/or movement of computer system 201 and/or display generation component(s) 214. For example, computer system 201 uses orientation sensor(s) 210 to track changes in the position and/or orientation of computer system 201 and/or display generation component (s) 214, such as with respect to physical objects in the real-world environment. Orientation sensor(s) 210 optionally include one or more gyroscopes and/or one or more accelerometers.

Computer system 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 (and/or other body tracking sensor(s), such as leg, torso and/or head tracking sensor(s)) can use image sensor(s) 206 (e.g., one or more IR cameras, three-dimensional (3D) cameras, depth cameras, etc.) that capture three-dimensional information from the real-world including one or more body parts (e.g., hands, legs, torso, or head of a human user). In some examples, the hands can be resolved with sufficient resolution to distinguish fingers and their respective positions. In some examples, one or more image sensors 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Computer system 201 is not limited to the components and configuration of FIG. 2, but can include fewer, other, or additional components in multiple configurations. In some examples, computer system 201 can be implemented between two computer systems (e.g., as a system). In some such examples, each of (or more) computer system may each include one or more of the same components discussed above, such as various sensors, one or more display generation components, one or more speakers, one or more processors, one or more memories, and/or communication circuitry. A person or persons using computer system 201, is optionally referred to herein as a user or users of the device.

Attention is now directed towards a three-dimensional environment presented at a computer system (e.g., corresponding to computer system 101) which includes displayed image sensor data, and specifically, systems and method for receiving images sensor data at the computer system and directly displaying the image sensor data within the three-dimensional environment.

Figure 3A:
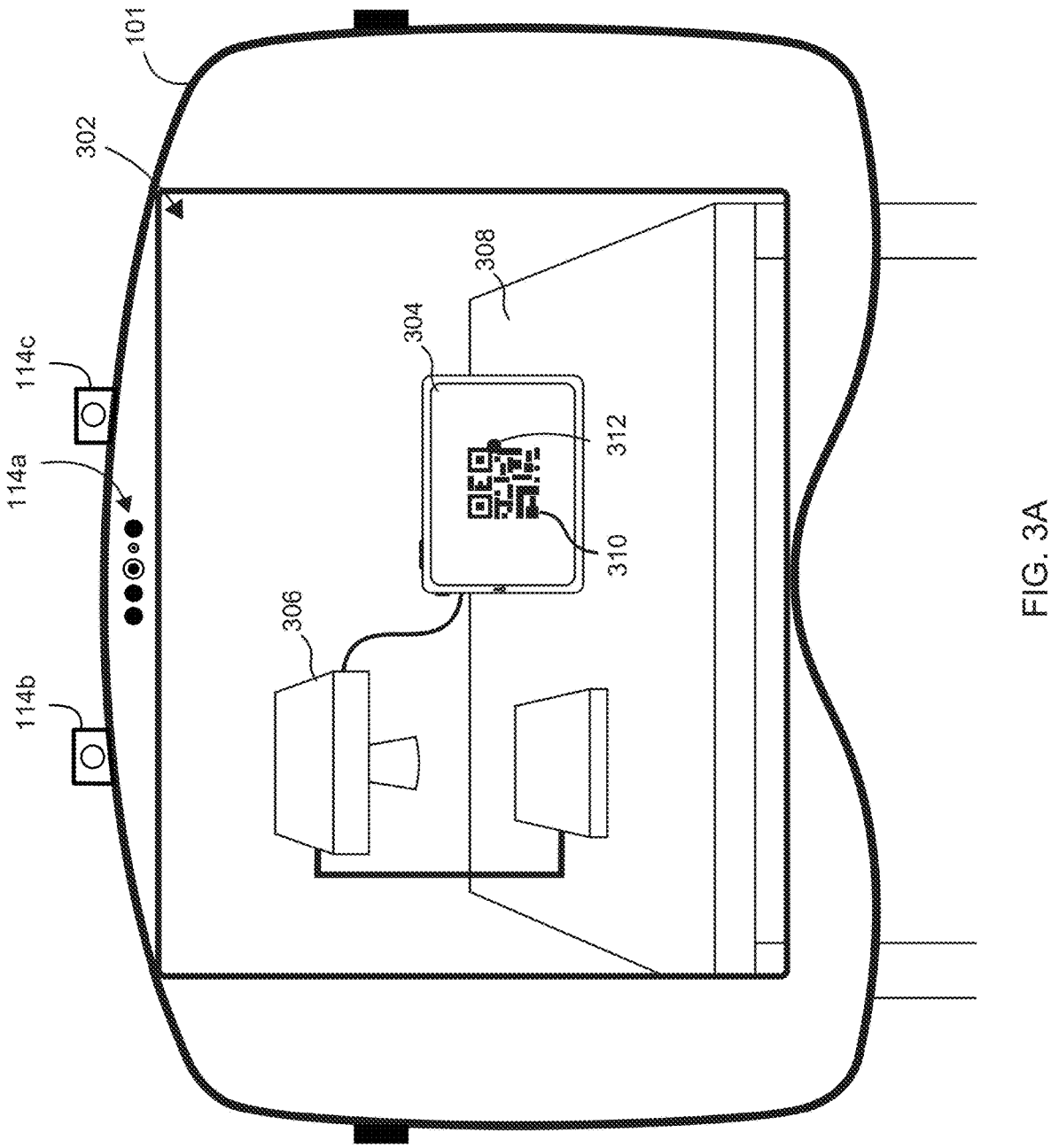
FIGS. 3A-3E illustrate an example system for displaying image sensor data in a three-dimensional environment according to some examples of the disclosure.

FIGS. 3A-3E illustrate an example system for displaying image sensor data in a three-dimensional environment according to some examples of the disclosure. In one or more examples, FIG. 3A illustrates an example three-dimensional environment 302 that is presented by computer system 101. In some examples, three-dimensional environment 302 is an XR environment that includes presentation of some of the physical environment. For example, three-dimensional environment 302 includes table 308 which is a physical table that is presented in the three-dimensional environment. In one or more examples, the objects on table 308 can also include real-world elements. For instance, in one or more examples, electronic device 304 displayed within three-dimensional environment 302 is a real-world electronic device that includes a display as illustrated. The electronic device is optionally a tablet computer, desktop computer, laptop computer, television, display monitor, etc. Similarly, three-dimensional environment 302 includes an image sensor 306 that is a real-world image sensor. In one or more examples, an image sensor refers to any device that captures visual data including but not limited to: a camera (e.g., red-green-blue, infrared, etc.), acoustic imager, light imaging and ranging (LIDAR) sensor, or any electronic device that is capable of rendering electronic images by collecting image data from real-world objects. In the example of FIG. 3A, image sensor 306 is illustrated as a microscope, but the example of a microscope is not meant to be limiting, and image sensor 306 can be implemented by any device that incorporates the features described above.

In one or more examples, and as illustrated in FIG. 3A, image sensor 306 is communicatively coupled to electronic device 304. In some examples, image sensor 306 can be communicatively coupled to electronic device 304 using a wired connection (as shown) such as a universal serial bus (USB, such as USB-C), High-Definition Multimedia Interface (HDMI), DisplayPort, or other interface. Additionally or alternatively, image sensor 306 can be communicatively coupled to electronic device 304 using one or more wireless connections such as Bluetooth, Wi-Fi, peer-to-peer network, etc. In one or more examples, by being communicatively coupled to image sensor 306, electronic device 304 can display image sensor data captured by image sensor 306. As illustrated in FIG. 3A, electronic device 304 includes a display that can render image data provided by image sensor 306. In one or more examples, the user of computer system 101 could thus view the image sensor data by viewing the display of electronic device 304 through the display of computer system 101. However, viewing image sensor data in this manner (e.g., viewing the display of electronic device 304 through the display of computer system) can lead to suboptimal conditions for viewing the image sensor data of image sensor 306. For instance, if the display of electronic device 304 refreshes asynchronously from the display of computer system 101, the user may experience visual degradation of the image sensor data in the form of visual artifacts and other distortions. Furthermore, the display of electronic device 304 may impose a physical constraint on the display of image sensor data due to its location in the three-dimensional environment 302, its resolution, orientation, etc. Thus, in one or examples, rather than or in addition to displaying the image sensor data through the display of electronic device 304, computer system 101 can directly receive image sensor data and display it within the three-dimensional environment as described in further detail below. By acquiring the image sensor data directly and displaying it within the three-dimensional environment, computer system 101 can eliminate and/or mitigate visual degradations associated with displaying image sensor data on a display of electronic device 304 as described above.

In one or more examples, electronic device 304 can include one or more applications stored in memory. The one or more applications can generate a visual code 310 when electronic device 304 detects that an image sensor, such as image sensor 306, is communicatively coupled to the device. Additionally or alternatively, visual code 310 can be displayed on electronic device 304 in response to one or more user inputs at the electronic device 304. Additionally or alternatively, visual code 310 can be permanently affixed to device 304 (for instance with a sticker that is on the device itself) and thus does not need a display to display the visual code. In one or more examples, visual code 310 can include information about the image sensor 306 embedded within the code, such that when computer system 101 accesses visual code 310 (captures an image of the visual code 310), computer system 101 can establish a communication link with image sensor 306. Establishing a communication link enables computer system 101 to receive image sensor data from the image sensor 306, which the computer system 101 can use to display the feed of the image sensor 306 within the three-dimensional environment 302 directly (e.g., independently from the display of electronic device 304). In one or more examples, visual code 310 can be implemented as a quick-response ("QR") code, DotCode, App Clip Code, Bar Code, Data Matrix, etc. Additionally or alternatively, visual code 310 can be implemented as a custom visual code that can be specifically tailored to provide connection information to computer system 101 so that computer system 101 can receive the image sensor data directly. In some examples, visual code 310 can be used to pair computer system 101 with electronic device 304 such that computer system 101 receives image sensor data from image sensor 306 indirectly (e.g., in the event that image sensor 306 does not have wireless communication capabilities).

In one or more examples, visual code 310 can include information embedded within the code that provides information to computer system 101 to establish a communication link with image sensor 306. so that computer system 101 can render/display the image sensor data within three-dimensional environment 302. Additionally or alternatively, in one or more examples, visual code 310 can include information embedded within the code that provides information to computer system regarding specifications of the image sensor data so that computer system 101 can render/display the image sensor data within three-dimensional environment 302. For instance, and with respect to information to establish a communication link with image sensor 306, visual code 310 can include communication link information such as internet protocol ("IP") address information or other types of information that can allow for computer system 101 to establish a communications link (either directly or indirectly) with image sensor 306. In some examples, visual code 310 can include information pertaining to the image sensor data, such as aspect ratio or screen resolution, or information pertaining to the display of electronic device 304, such as size, screen resolution, or location information that computer system 101 can use to display the image sensor data within the three-dimensional environment 302.

Figure 3B:
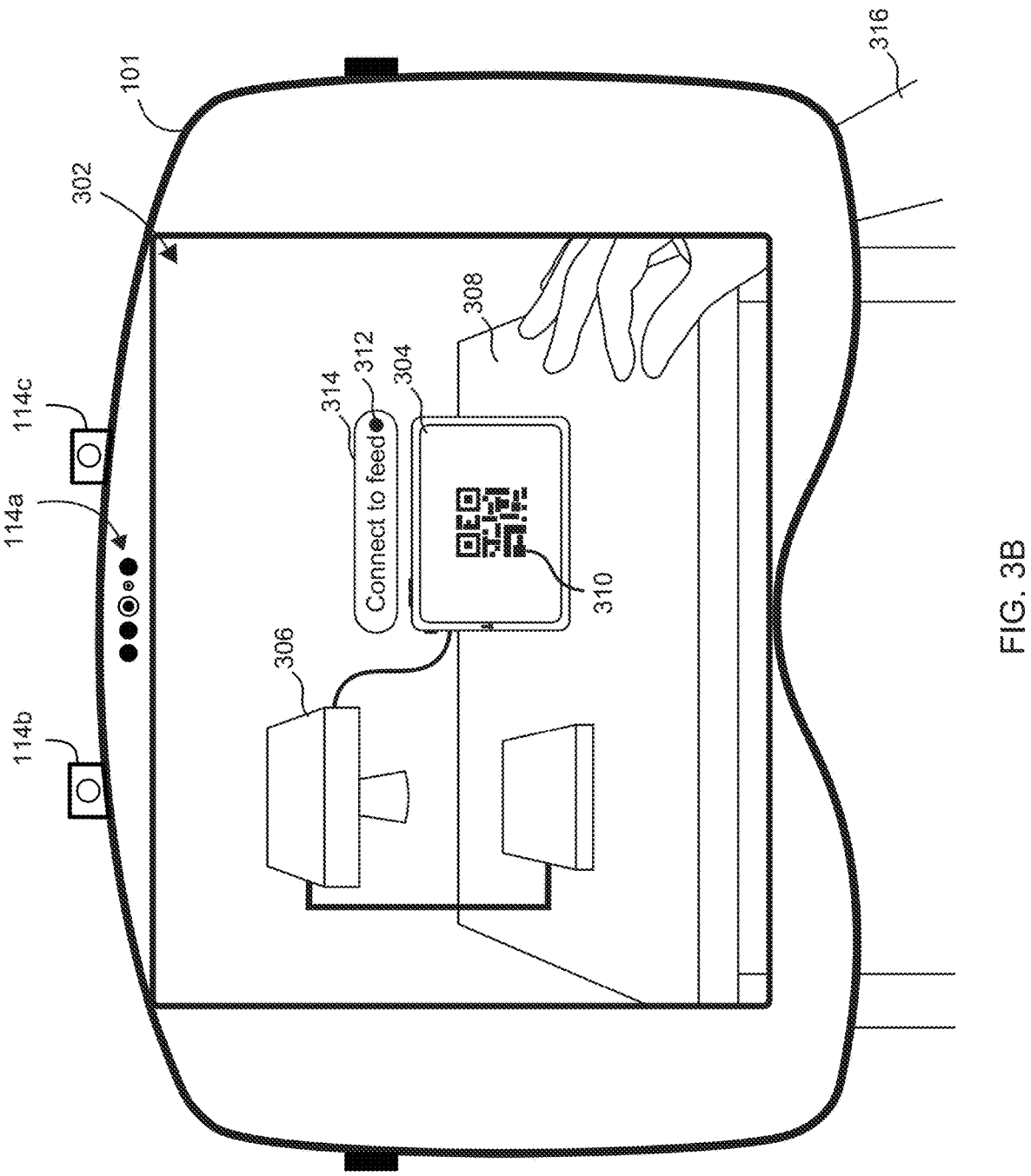

In one or more examples, once visual code 310 is displayed on the display of electronic device 304, the user of computer system 101 can initiate the process of displaying image sensor data from image sensor 306 by providing an indication (e.g., using one or more portions of their body) to computer system 101 to display the image sensor data. For instance, in one or more examples, computer system 101 can initiate a process to display image sensor data of image sensor 306 in response to detecting the gaze 312 (and/or orientation of the computer system) of the user directed to the location where the visual code 310 is located within the three-dimensional environment 302 as illustrated in FIG. 3B, optionally for a threshold duration and optionally in addition to another input (e.g., hand gesture, voice command, or the like). In some examples, the user can set a default location within the three-dimensional environment 302 to display image sensor data (before the image sensor data is displayed), and as discussed below can change the location where the image sensor data is displayed after the image sensor data has been displayed in the three-dimensional environment. In some examples, computer system 101 can automatically initiate the process of displaying image sensor data without requiring input from the user.

In the example of FIG. 3B, in response to detecting the gaze 312 of the user direction to the location within the three-dimensional environment 302 where visual code 310 is located (e.g., on the display of electronic device 304), computer system 101 may display an image sensor activation user interface 314 for receiving user input confirming that the user of computer system 101 wants to display image sensor data from image sensor 306. In some examples, image sensor activation user interface 314 includes a selectable option that a user can select. In response to detecting selection of the selectable option of image sensor activation user interface 314 (for instance by detecting the user's hand 316 performing an air gesture such as an air pinch while also detecting the user's gaze 312 directed at user interface 314), computer system 101 establishes a communication link to image sensor 306 (e.g., using the information embedded in visual code 310) and displays image sensor data from image sensor 306 as illustrated in FIG. 3C.

Figure 3C:
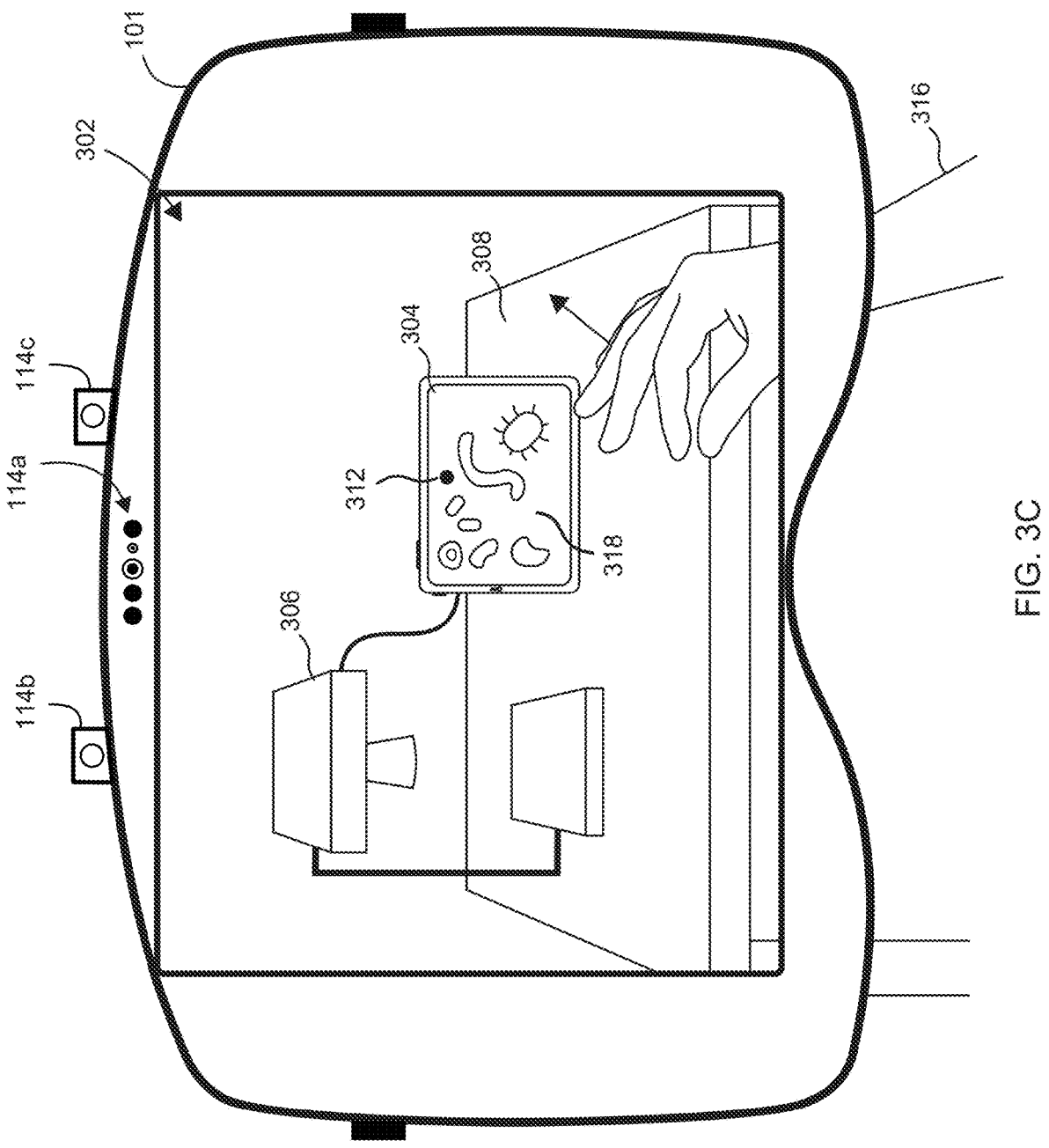

In the example of FIG. 3C, and after establishing a communication link with image sensor 306 as described above (and as described in further detail below), computer system 101 receives image sensor data from image sensor 306 and displays the image sensor data within the three-dimensional environment 302 as an image sensor data feed 318. In one or more examples, image sensor data feed 318 provides a real-time or near real-time (e.g., less than a threshold delay such as 1 ms, 10 ms, 50 ms, 100 ms, etc.) display of the image data that is being collected by image sensor 306. Thus, in one or more examples, when image sensor 306 is capturing video, feed 318 is represented in three-dimensional environment 302 by computer system 101 as a video feed. In one or more examples, when image sensor 306 is capturing a still image, feed 318 is represented in three-dimensional environment 302 by computer system 101 as a still image feed.

In one or more examples, computer system 101 renders and/or displays feed 318 according to one or more display specifications associated with the display of electronic device, such as size, screen resolution, or location, or one or more image specifications associated with the image sensor data of image sensor 306. For instance, and as described above, visual code 310 can have one or more specifications embedded with the code such as the aspect ratio of the image data as well as the resolution of the image sensor data. Additionally or alternatively, the image specifications can be embedded in the actual image sensor data that is received from the image sensor 306 at computer system 101 or transmitted to the computer system from the electronic device separately. In the case where the image specifications are embedded within the image sensor data, computer system 101 can extract the image specifications from the image sensor data and use them to render and display the image sensor data within three-dimensional environment 302. In some examples, rendering/displaying image sensor data based on the image specifications or display specifications can include displaying feed 318 according to the aspect ratio and/or resolution specified in the image specifications or according to the size, screen resolution, or location specified in the display specifications.

In one or more examples, and as illustrated in FIG. 3C, feed 318 is initially displayed at the location of the display of electronic device 304, such that the feed is superimposed on the display, thereby giving the appearance that image sensor data is being displayed by electronic device 304. In some examples, computer system 101 ceases to display visual code 310 in the three-dimensional environment while displaying the image sensor data superimposed on the display of electronic device 304. Thus, in one or more examples, the screen resolution and aspect ratio provided in the image specifications can be used to display feed 318 in the same manner as if electronic device 304 were displaying the feed 318. In some examples, the display specifications (described above) can also include position and size information that can be used to position and size the display feed 318 within three-dimensional environment 302. Additionally or alternatively, computer system 101 can use visual code 310 as an "anchor" (e.g., a fixed position within three-dimensional environment 302) for positioning display feed 310 within three-dimensional environment 302. However, in contrast to the example where the image sensor data is actually displayed by electronic device 304 and viewed through the display of computer system 101, in the example where computer system 101 receives the image sensor data and directly displays the feed, the user of the computer system is able to have an improved view of the image sensor data. Additionally or alternatively, the user of the computer system is able to have greater control and flexibility over how the image sensor data is displayed. For instance, in one or more examples, in response to detecting the user gaze 312 directed at feed 318, and while detecting the user's hand 316 performing an air gesture, computer system 101 can move feed 318 to a different location within the three-dimensional environment 302 commensurate with the movement of the user's hand as illustrated in FIG. 3D.

Figure 3D:
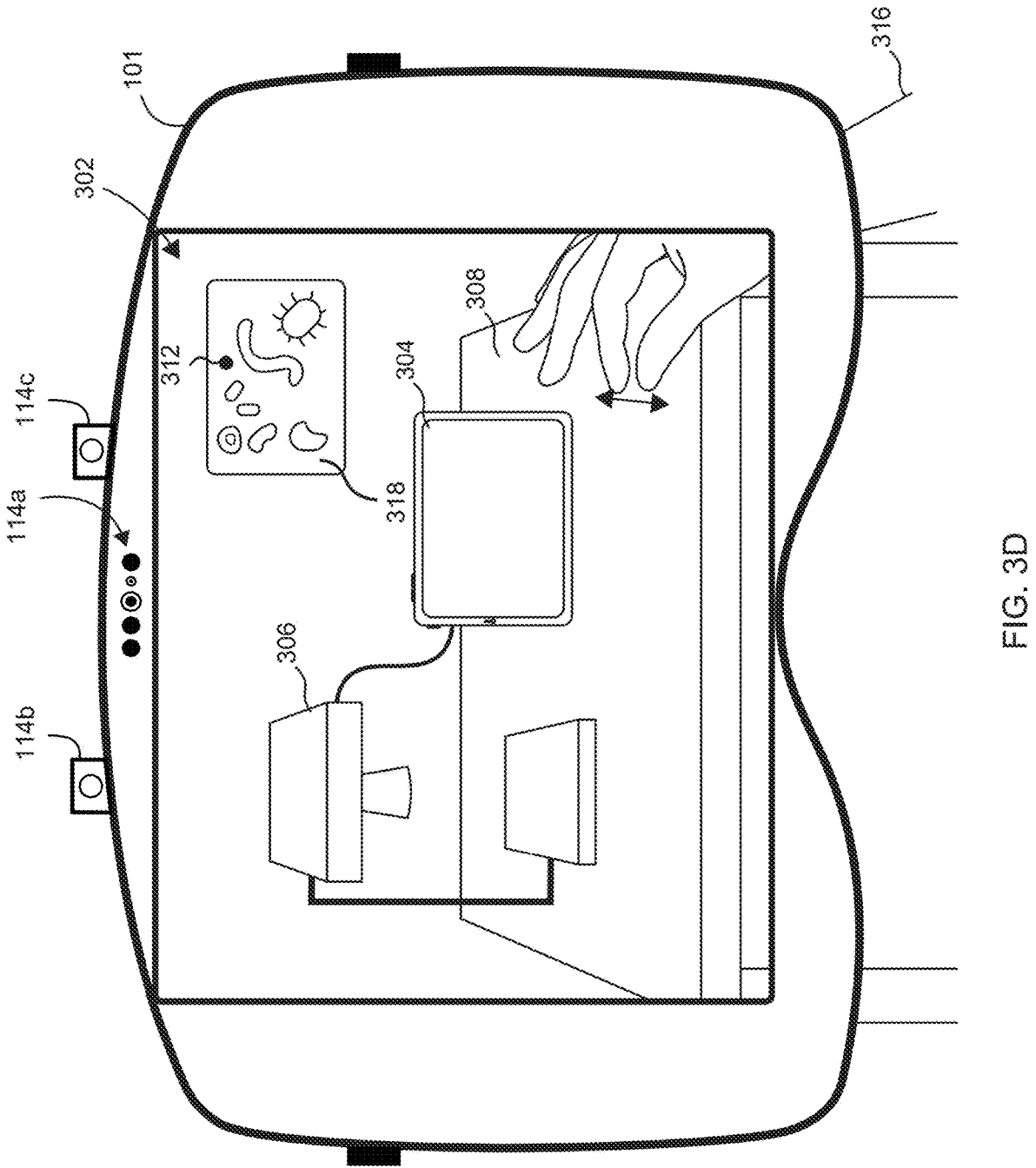
Figure 3E:
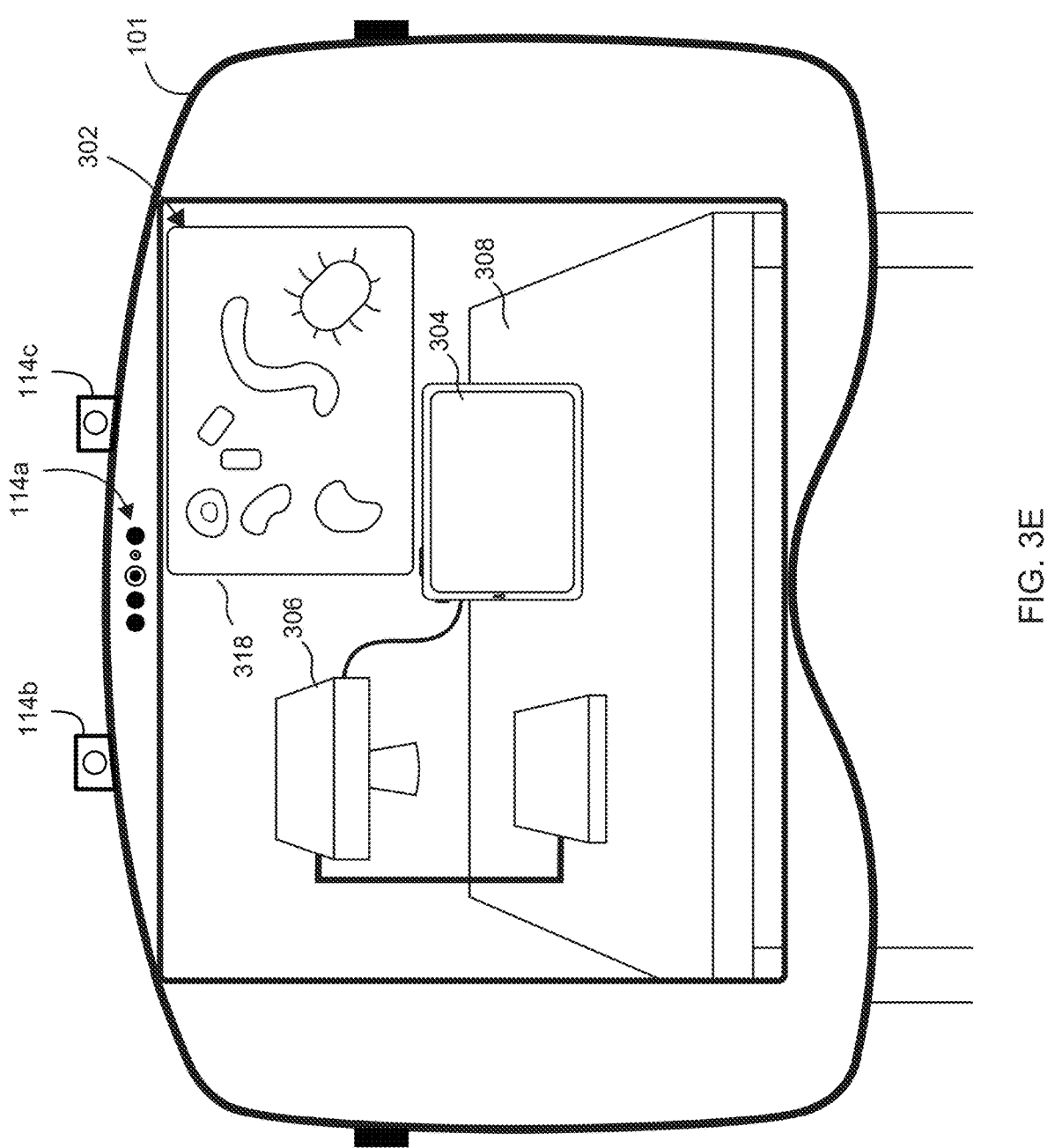

In one or more examples, and as illustrated in FIG. 3D, image sensor data feed 318 has been moved from being displayed at or over the display of electronic device 304 to being displayed in a second location within the three-dimensional environment. Optionally, the display of electronic device 304 can be turned off. In some examples, electronic device 304 can concurrently display feed 318 at electronic device 304 and at the second location (for instance, if other users are viewing electronic device 304 without a computer system like computer system 101). In some examples, when image sensor data feed 318 has been moved to the second location, electronic device 304 can continue to display visual code 310, thereby providing a visual anchor for computer system 101. The second location where feed 318 is displayed by computer system 101 is commensurate with the motion of the user's hand. Thus, the distance and location from the original display location to the new display location of feed 318 is based on the direction and amount of movement of the user's hand 316. Because the computer system 101 now receives (directly or indirectly) the image sensor data from image sensor 306, the user can customize where the feed 318 is displayed within the three-dimensional environment 302. In the example where the feed is displayed on electronic device 304 without the computer system having access to the underlying image sensor data, such customization would not have been possible since the image sensor data would be "locked" to the location of the electronic device 304. In one or more examples, the customization of feed 318 is not limited to simply moving the location of the feed but can also include resizing the feed 318. For instance, while detecting the gaze 312 of the user and while the user performs an air gesture with hand 316 (such as expanding the distance between their thumber and index finger), computer system 101 can enlarge the size of feed 318 as illustrated in FIG. 3E. The example of using gaze and performing an air gesture to enlarge the size of feed 318 is provided as an example and should not be seen as limiting to the disclosure. In one or more example, the input for modifying the size of feed 318 can from other types of input (e.g., gaze without a gesture, a gesture without gaze, using input to one or more user interfaces or affordances, a button press, touch input to a touch screen or touch sensor panel, voice input, etc.).

In one or more examples, and as illustrated in FIG. 3E, feed 318 has been resized (in this case made larger) in accordance with the movement of the user's hand 316 (and specifically, the amount of movement of the thumb and index finger of the user). In some examples, the user of computer system 101 can similarly cause the size of feed 318 to decrease as well (for instance by bringing together their thumb and index finger), or by using other inputs including receiving inputs by one or more user interfaces or affordances. In one or more examples, computer system 101 resizes the feed 318 in accordance with the movement of the user's hand 316, and also in accordance with the image specifications provided to the computer system 101 (as described above). For instance, when enlarging feed 318, computer system 101 can display feed 318 at a larger size but still maintain the aspect ratio and screen resolution associated with the feed 318.

In some examples, and using the communication link established above, the user can send commands to the image sensor 306. For instance, the user could use one or more gestures to change the zoom of the image sensor 306 or change the position of the optical lens of image sensor 306. In some examples, the user can initiate a command to the image sensor 306 by looking at either image sensor 306 or the image sensor data feed when performing the gesture.

FIG. 4 illustrates an example flow diagram illustrating a method or process of displaying image sensor data in a three-dimensional environment according to examples of the disclosure. In one or more examples, process 400 of FIG. 4 illustrates an exemplary process illustrated by the example of FIGS. 3A-3E described above. In one or more examples, one or more displays (e.g., of computer system 101) present a three-dimensional environment including an electronic device with a display (e.g., electronic device 304 displayed in three-dimensional environment 302). the electronic device is communicatively coupled to an image sensor (e.g., electronic device 304 communicatively coupled to image sensor 306). While presenting the three-dimensional environment including the electronic device, computer system 101 receives (402) an indication to display image sensor data from the image sensor that is communicatively coupled to the electronic device. In one or more examples, the indication to display image sensor data from the image sensor is provided to computer system 101 via a visual code (e.g., visual code 310 illustrated in FIG. 3A) that can be selected by the user (e.g., by the user gazing at the visual code and/or performing an air gesture). Additionally or alternatively, the computer system 101 receives the indication from the visual code appearing (e.g., on the display of device 304) in the three-dimensional environment without requiring that the user select the visual code. In some examples, in response to receiving a selection from the user or otherwise detecting and/or selecting the visual code, computer system 101 optionally displays a user interface that the user can select to initiate display of the image sensor data within the three-dimensional environment.

In some examples, in response to receiving an indication to display image sensor data from the image sensor that is communicatively coupled to the electronic device, computer system 101 establishes (404) a communication link to the image sensor communicatively coupled to the electronic device. In one or more examples, computer system 101 establishes a communication link with the image sensor using connection information that embedded in the visual code described above. For instance, the visual code includes IP information embedded within in it, that provides an IP address where the image sensor data can be accessed. Thus, in one or more examples, computer system 101 uses the IP information to establish a communication link with the image sensor, thereby gaining access to the image sensor data.

In one or more examples, after computer system 101 establishes a communication link with the image sensor, computer system 101 receives (406) image sensor data via the communication link and displays (408) the image sensor data from the image sensor in the three-dimensional environment (such as image sensor data feed 318 in FIG. 3C). In some examples, the image sensor data feed can be initially displayed on the electronic device (making it seem as if the image sensor data is being displayed on the display of the electronic device). In some examples, computer system 101 uses display information that is either embedded in the visual code or is transmitted as part of the image sensor data to display the image sensor data in the three-dimensional environment (e.g., via the same communication link or a different communication link). For instance, display information can include an aspect ratio and screen resolution associated with the image sensor data as well as a location in three-dimensional space where the image sensor data is to be displayed. In one or more examples, and using the display information, computer system 101 display the image sensor data in accordance with the display information (e.g., image specifications) within the three-dimensional environment.

It is understood that process 400 is an example and that more, fewer, or different operations can be performed in the same or in a different order. For example, the establishment of a communication link and/or display of the image sensor data within the three-dimensional environment can be initiated without displaying or receiving user interface input (e.g., automatically or using other inputs without displaying a user interface). Additionally, the operations in process 400 described above are, optionally, implemented by running one or more functional modules in an information processing apparatus such as general-purpose processors (e.g., as described with respect to FIG. 2) or application specific chips, and/or by other components of FIG. 2.

Figure 5A:
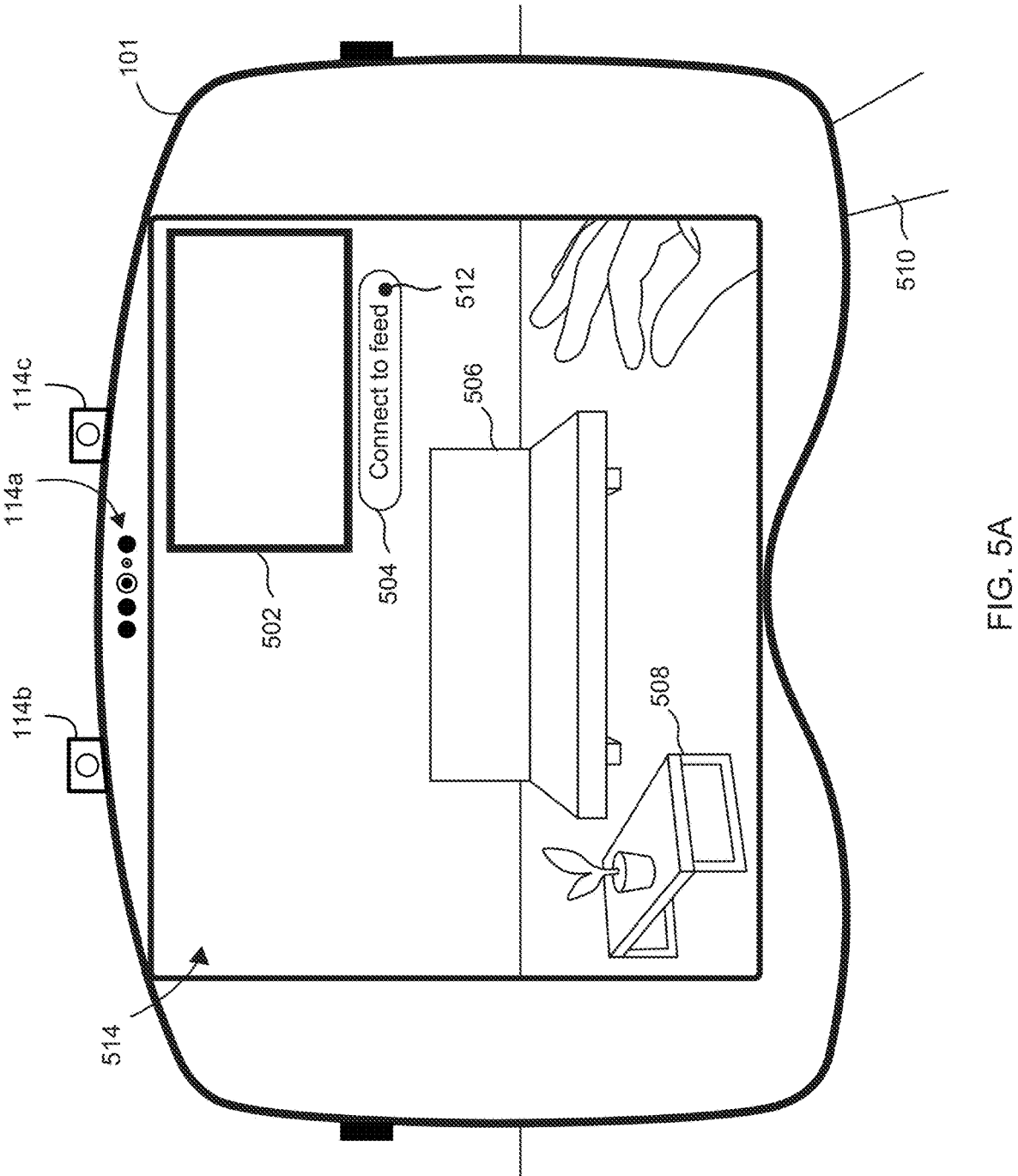
FIGS. 5A-5E illustrate an example system for displaying image sensor data in a three-dimensional environment according to some examples of the disclosure.

FIGS. 5A-5E illustrate an example system for displaying image sensor data in a three-dimensional environment according to some examples of the disclosure. In one or more examples, FIG. 5A illustrates an example three-dimensional environment 514 that is presented by computer system 101. In some examples, three-dimensional environment 514 is an extended-reality environment that includes visualizations of the user's physical environment that computer system 101 augments by placing other visualizations within the three-dimensional environment thereby creating an extended-reality environment. Thus, in one or more examples, three-dimensional environment 514 includes sofa 506 and table 508 which are a physical sofa and table respectively that are incorporated into the three-dimensional environment.

In one or more examples, three-dimensional environment 514 includes a pre-defined area 502 for displaying one or more image sensor data feeds (similar to the image sensor data feed 318 described above). In some examples, pre-defined area 502 can correspond to a physical electronic device (e.g., a monitor or television) that is visible within three-dimensional environment 514. Additionally or alternatively, pre-defined area 502 can correspond to some other physical object in the three-dimensional environment such as a picture frame, window, door, etc. In some examples, pre-defined area 502 does not correspond to any physical object visible within three-dimensional environment 514 and instead is a virtual area that can be floating in space and that is defined by computer system 101 and is placed in the three-dimensional environment 514 by computer system 101 (or the user) for the purpose of designating an area within the three-dimensional environment 514 where image sensor data can be displayed.

In one or more examples, and as illustrated in FIG. 5A, computer system 101 displays an image sensor connection user interface 504 for displaying an image sensor data feed. In some examples, image sensor connection user interface 504 can be displayed adjacent to pre-defined area 502 thereby indicating that the user interface 504 corresponds to displaying image sensor data at pre-defined area 502. In one or more examples, and in response to detecting a selection of image sensor connection user interface 504 (e.g., by detecting the gaze 512 of the user of the computer system directed at user interface 504 while the hand 510 of the user performs an air gesture (such as an air pinch)), computer system 101 displays an image sensor selection user interface 516 as illustrated in FIG. 5B.

Figure 5B:
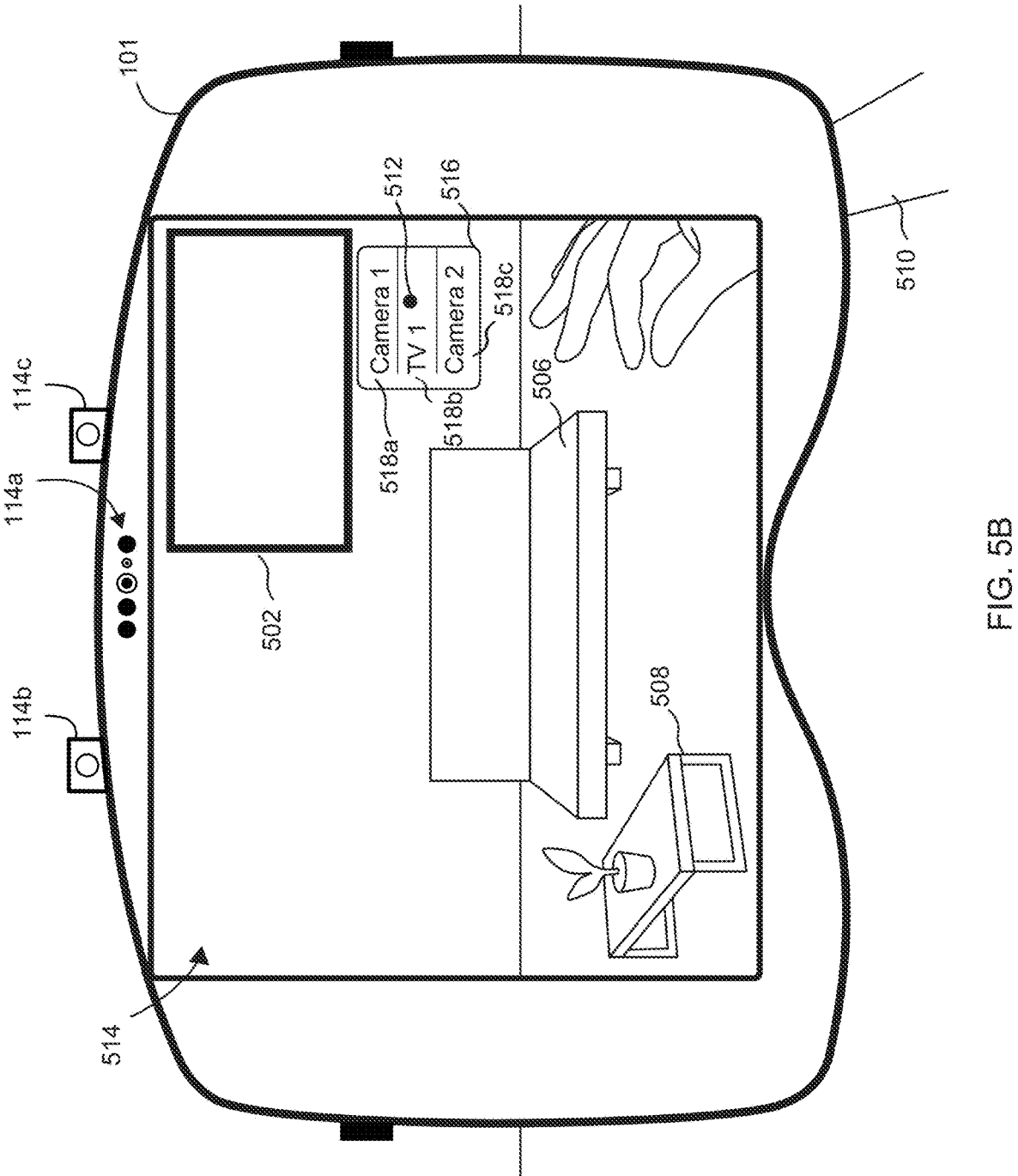
Figure 5C:
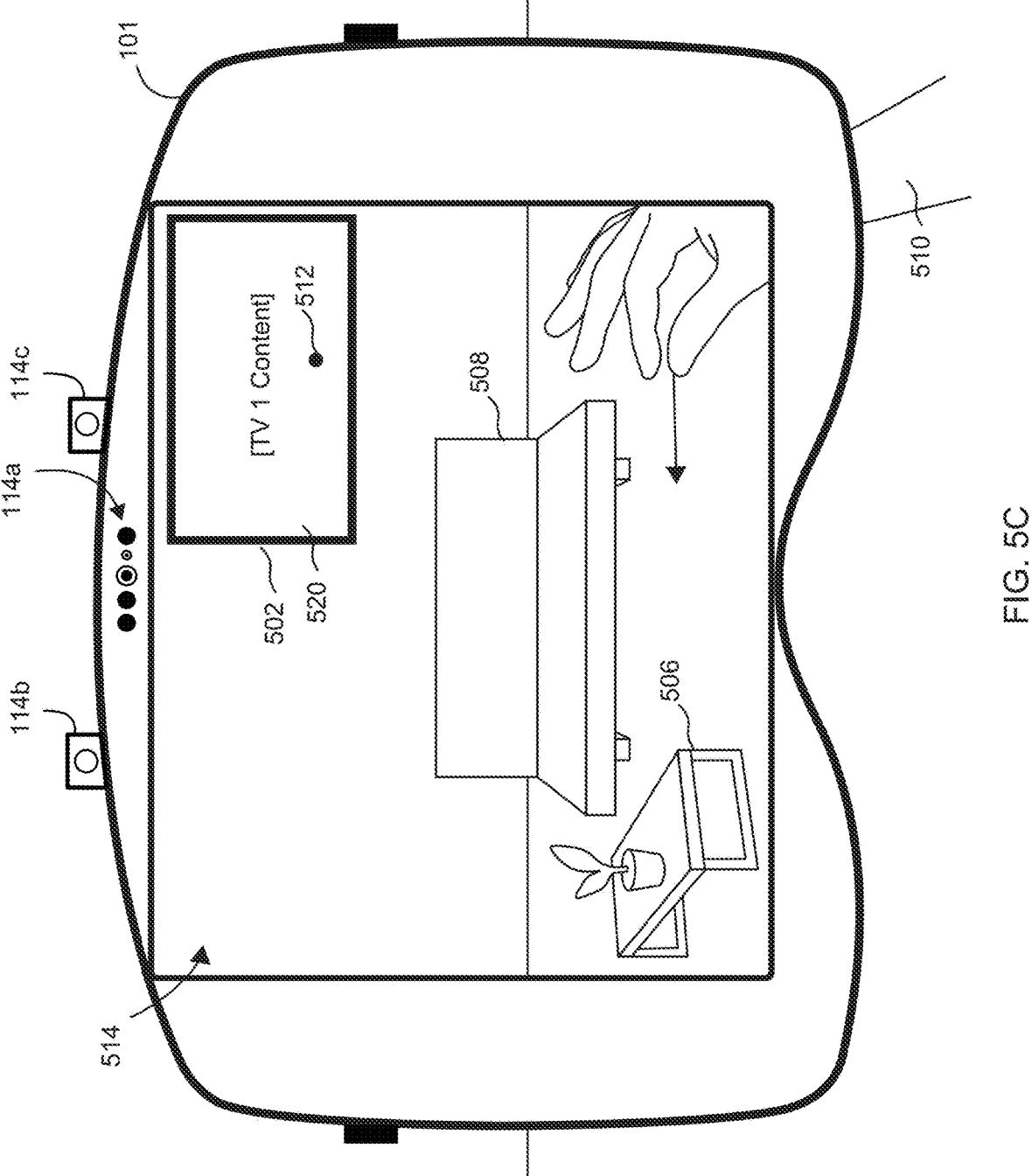

As illustrated in FIG. 5B, image sensor selection user interface 516 includes one or more selectable options 518a-518c for facilitating the user of computer system 101 to select an image sensor data feed from a list of one or more image data sensor feeds that are available to be displayed on computer system 101. In one or more examples, each of selectable options 518a-518c corresponds to an image sensor data feed of one or more image sensor data feeds that is available to be displayed within the three-dimensional environment 514 and specifically at pre-defined area 502. In some examples, each of the image sensor data feeds displayed on image sensor selection user interface 516 pertains to an image sensor data feed that has transmitted an indication to computer system 101 that the image sensor data feed is available for display. For instance, for each selectable option 518a-518c, a device that is part of the image sensor used to collect the image sensor data feed, or a device that is communicatively coupled to the image sensor (e.g., corresponding to electronic device 304), transmits (or broadcasts) information concerning the image sensor data feed to computer system 101. In some examples, the information can include the IP address where the feed can be accessed, the aspect ratio of the feed, as well as resolution information about the feed (similar to the information described above with respect to FIGS. 3A-3E). In one or more examples, computer system 101 upon receiving information pertaining to an image sensor data feed, stores the information in the memory of the computer system, and generates a selectable option on image sensor selection user interface 516 that the user can select to initiate displaying of the image sensor data feed within three-dimensional environment 514. The image sensors corresponding to selectable entries 518a-518c share one or more characteristics to image sensor described above with respect to FIGS. 3A-3E. In one more examples, in response to receiving a selection of a selection option 518a-518c (for instance in response to detecting the gaze 512 of user on selectable option 518b, while also detecting performance of an air gesture by hand 510), computer system 101 can establish a communication link with the image sensor and display the image sensor data feed corresponding to the selected selectable option as illustrated in FIG. 5C. In one or more examples, computer system 101 uses the information associated with the selected image sensor data feed to establish the communication link (for instance by establishing a communication link at the IP address associated with the image sensor data feed).

In the example of FIG. 5C, and after establishing a communication link with the image sensor associated with the selected feed as described above (and as described in further detail below), computer system 101 receives image sensor data from the selected image sensor and displays the image sensor data within the three-dimensional environment 514 as an image sensor data feed 520. In one or more examples, image sensor data feed 520 provides a real-time or near real-time display of the image data that is being collected by the image sensor associated with feed 520. Thus, in one or more examples, if the image sensor associated with feed 520 is displaying video, then feed 520 will be represented in three-dimensional environment 514 as a video feed. In one or more examples, if the image sensor associated with feed 520 is providing a still image, then feed 520 will be displayed by computer system 101 as a still image feed.

In one or more examples, computer system 101 renders and displays feed 520 according to one or mor image specifications and/or display specifications associated with the image sensor data of image sensor data feed 520. For instance, and as described above, computer system 101 can store information associated with feed 520 (prior to feed 520 being selected) including the aspect ratio of the image data as well as the resolution of the image sensor data or according to the size, screen resolution, or location specified in the display specifications. Additionally or alternatively, the image and/or display specifications can be embedded in the actual image sensor data that is received from the image sensor at computer system 101. In the case where the image and/or display specifications are embedded within the image sensor data, computer system 101 can extract the specifications from the image sensor data and use them to render and display the image sensor data within three-dimensional environment 514. In some examples, rendering/displaying image sensor data based on the image and/or display specifications can include displaying feed 520 according to the aspect ratio and/or resolution specified in the image specifications or according to the size, screen resolution, or location specified in the display specifications.

In one or more examples, and as illustrated in FIG. 5C, feed 520 is initially displayed at pre-defined area 502, such that the feed is superimposed on the pre-defined area. In one or more examples, the user of the computer system 10 is able to have control and flexibility over how the image sensor data is displayed. For instance, in one or more examples, in response to detecting the user gaze 512 directed at feed 520, and while detecting the user's hand 510 performing an air gesture, computer system 101 can move feed 520 to a different location within the three-dimensional environment 514 commensurate with the movement of the user's hand as illustrated in FIG. 5D.

Figure 5D:
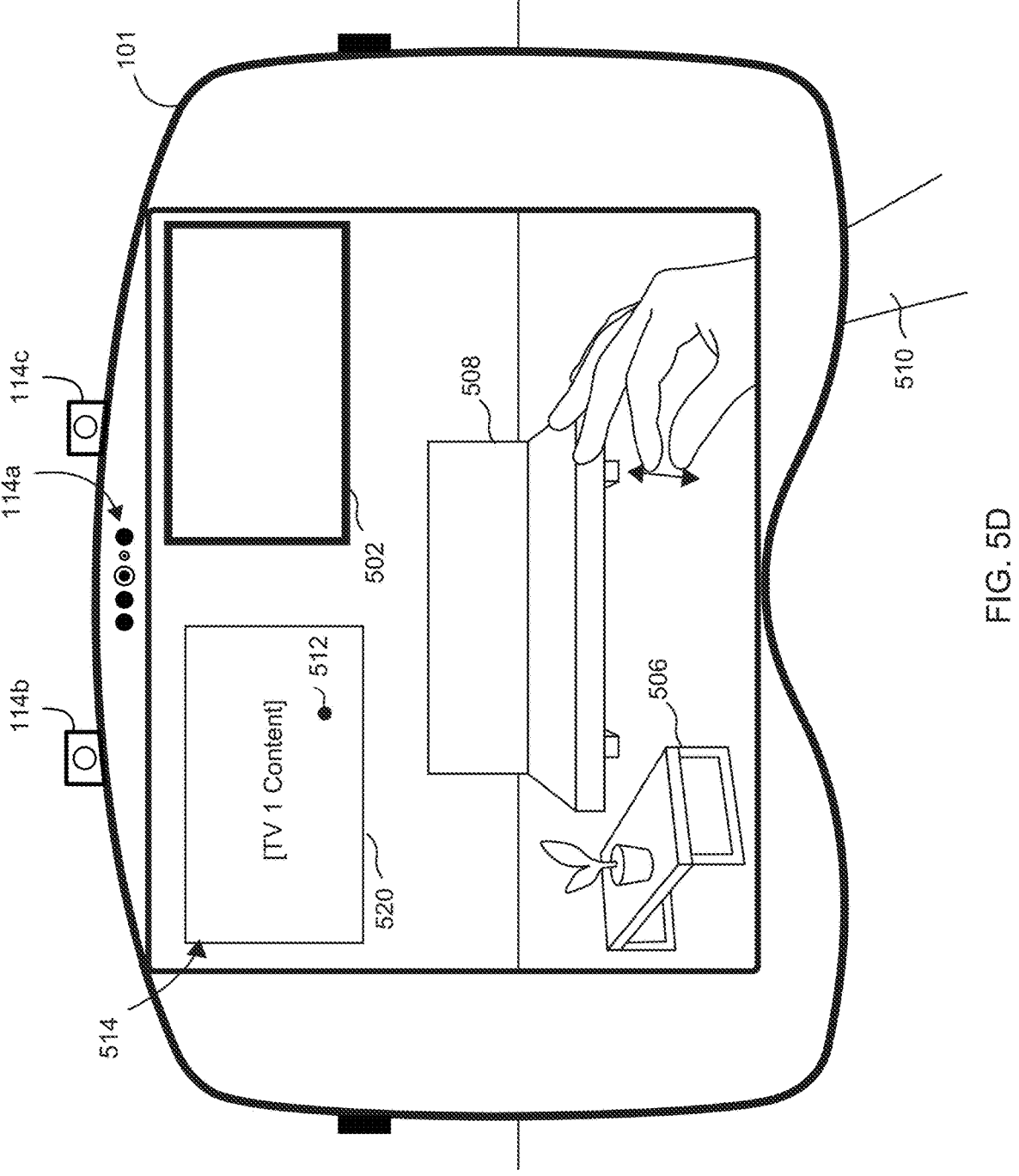

In one or more examples, and as illustrated in FIG. 5D, image sensor data feed 520 has moved from being displayed over the pre-defined area 502 to being displayed in a second location within the three-dimensional environment 514. The second location where feed 520 is displayed by computer system 101 is commensurate with the motion of the user's hand 510. Thus, the distance and location from the original display location to the new display location of feed 520 is based on the direction and amount of movement of the user's hand 510. Because the computer system 101 now receives (directly or indirectly) the image sensor data from the image sensor, it can now allow the user to customize where the feed 520 is displayed within the three-dimensional environment 514. In one or more examples, the customization of feed 520 is not limited to simply moving the location of the feed but can also include resizing the feed 520. For instance, while detecting the gaze 512 of the user and while the user performs an air gesture with hand 510 (such as expanding the distance between their thumber and index finger), computer system 101 can enlarge the size of feed 520 as illustrated in FIG. 5E.

Figure 5E:
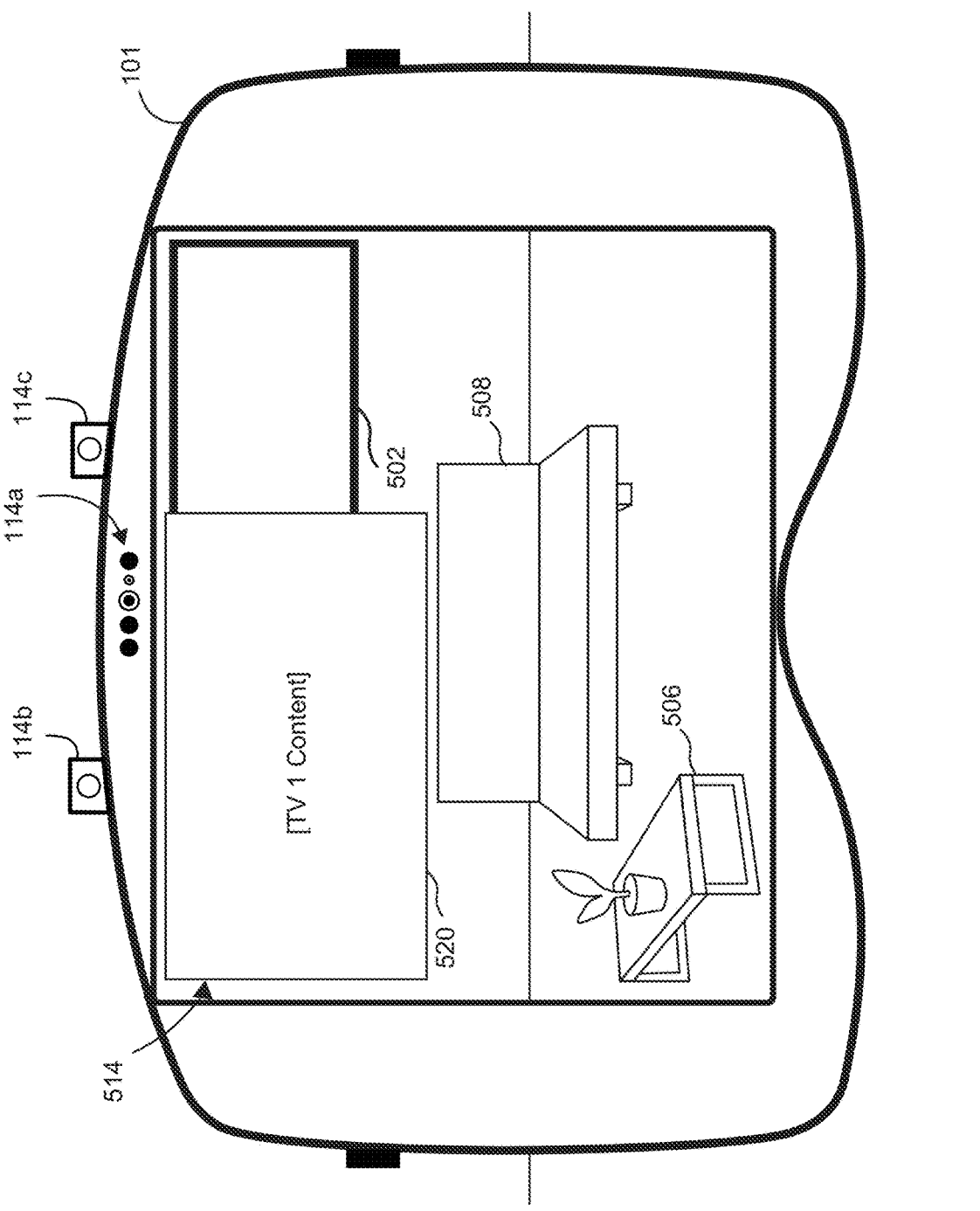

In one or more examples, and as illustrated in FIG. 5E, feed 518 has been resized (in this case made larger) in accordance with the movement of the user's hand 510 (and specifically, the amount of movement of the thumb and index finger of the user). In some examples, the user of computer system 101 can similarly cause the size of feed 520 to decrease as well (for instance by bringing together their thumb and index finger). In one or more examples, computer system 101 can not only resize the feed 520 in accordance with the movement of the user's hand 510, but also in accordance with the image specifications provided to computer system 101 (as described above). For instance, when enlarging feed 520, computer system 101 can display feed 520 at a larger size but still maintain the aspect ratio and screen resolution associated with the feed 520. In the example of FIGS. 5A-5E, while a single image sensor data feed is illustrated, the example should not be seen as limiting, and the examples described above could be applied to multiple image sensor data feeds being displayed simultaneously within the three-dimensional environment.

FIG. 6 illustrates an example flow diagram illustrating a method of displaying image sensor data in a three-dimensional environment according to examples of the disclosure. In one or more examples, process 600 of FIG. 6 illustrates an exemplary process illustrated by the example of FIGS. 5A-5E described above. In some examples, while displaying, via one or more displays, a three-dimensional environment (such as three-dimensional environment 514), wherein the three-dimensional environment includes a first pre-defined location within the three-dimensional environment (such as pre-define area 502 in FIG. 5A), computer system 101 receives (602) an indication to display image sensor data from a first image sensor at the first pre-defined location within the three-dimensional environment. For instance, in one or more examples, computer system 101 receives the indication to display image sensor data from a user that selects one or more image sensor data feeds that are displayed on a user interface (such as interface 504 in FIG. 5A).

In some examples, in response to receiving the indication to display image sensor data from the first image sensor at the first pre-defined location, computer system 101 establishes (604) a communication link to the first image sensor. In one or more examples, computer system 101 stores connection information (such as IP address information) associated with the first image sensor, and uses that information to establish a communication link with the image sensor thereby generating a communication link with the first image sensor for the purpose of receiving image sensor data from the first image sensor that can be used to display the image sensor data within the three-dimensional environment.

In some examples, after establishing a communication link with the first image sensor, computer system 101 receives (606) image sensor from the first image sensor via the established communication link and displays (608) the image sensor data from the first image sensor in the three-dimensional environment at the first pre-defined location). In some examples, the image sensor data feed can be initially displayed at the pre-defined location but can be moved and resized within the three-dimensional environment. In some examples, computer system 101 uses display information that is stored by the computer system and is associated with the image sensor to display the image sensor data in the three-dimensional environment. For instance, display information can include an aspect ratio and screen resolution associated with the image sensor data. In one or more examples, and using the display information, computer system 101 displays the image sensor data in accordance with the display information (e.g., image specifications) within the three-dimensional environment.

It is understood that process 600 is an example and that more, fewer, or different operations can be performed in the same or in a different order. Additionally, the operations in process 400 described above are, optionally, implemented by running one or more functional modules in an information processing apparatus such as general-purpose processors (e.g., as described with respect to FIG. 2) or application specific chips, and/or by other components of FIG. 2.

FIG. 7 illustrates an example communication link between an image sensor and a computer system according to some examples of the disclosure. In one or more examples, the example system 700 of FIG. 7 illustrates the communication link between an external image sensor and computer system 101 described above with respect to processes 400 and 600. In one or more examples, image sensor 706 (described in detail above with respect to FIGS. 3A-3E and 5A-5E) is connected to a transmitter 702, and the transmitter is configured to transmit image sensor data to computer system 710 (e.g., similar or identical to computer system 101 or 201, described above) once a communication link has been established between the image sensor 706 and computer system 101. In the example of FIG. 7 transmitter 702 is shown as a separate component from image sensor 706, however with respect to transmitter 702 and video card 704 (described below), any or of all of these components can be integrated with image sensor 706 as part of the same device, and the functionality could be implemented by one or more processors.

In one or more examples, and in the example where image sensor 706 and transmitter 702 are implemented on separate devices or are not integrated, image sensor 706 can be connected to transmitter 702 via video card 704. In one or more examples, video card 704 is configured to accept data from image sensor 706 using a variety of interface formats such as HDMI, DisplayPort, Mini DisplayPort, Video Graphics Array (VGA), and Digital Visual Interface (DVI). In one or more examples, video card can accept a variety of input types (e.g., interface formats) described above, but can convert and output any received signal to a common format such as USB-C. In one or more examples, video card 704 is optional. For instance, where the transmitter 702 is integrated with the image sensor 706, video card 704 may be unnecessary as the image sensor 706 and transmitter 702 may have access to a common memory.

In one or more examples, transmitter 702 can transmit any received image sensor data to receiver 708 that is communicatively coupled to or part of computer system 101. In one or more examples, transmitter 702 and receiver 708 can be communicatively coupled to one another across a variety of mediums including both wired and wireless transmission mediums. In one or more examples, transmitter 702 can transmit image sensor data to receiver 708 using an internet protocol with each of the transmitter 702 and receiver 708 having its own IP address and connected to one another over a public or private computer network (such as the internet or a peer-to-peer network). In some examples, receiver 708 receives data from the transmitter 702, which can be transmitted to or otherwise accessed by computer system 101 (via either a wired or wireless connection). Computer system 101 then uses the data to render and/or display the received image sensor data in accordance with the examples described above.

Therefore, according to the above, some examples of the disclosure are directed to a method comprising: at a computer system in communication with one or more displays and one or more input devices: while presenting, via the one or more displays, a three-dimensional environment including an electronic device with a display, wherein the electronic device is communicatively coupled to an image sensor, receiving an indication to display image sensor data from the image sensor that is communicatively coupled to the electronic device, in response to receiving an indication to display image sensor data from the image sensor that is communicatively coupled to the electronic device, establishing a communication link to the image sensor communicatively coupled to the electronic device, receiving image sensor data from the image sensor via the communication link, and displaying the image sensor data from the image sensor in the three-dimensional environment.

Optionally, receiving the indication to display image sensor data from the image sensor that is communicatively coupled to the electronic device comprises detecting that a user of the computer system is gazing at the display of the electronic device while the display of the electronic device displays a visual code.

Optionally, the visual code is displayed on the electronic device in response to receiving an indication at the electronic device that the electronic device is communicatively coupled to the image sensor.

Optionally, the visual code is a quick-response (QR) code.

Optionally, the visual code includes internet protocol information for accessing the image sensor data from the image sensor.

Optionally, the visual code includes one or more of resolution information and aspect ratio information associated with the image sensor data from the image sensor.

Optionally, the visual code includes one or more of screen resolution information, size information, or location of display information of the electronic device.

Optionally, receiving the indication to display image sensor data from the image sensor that is communicatively coupled to the electronic device further comprises: in response to detecting that the user of the computer system is gazing at the display of the electronic device while the display of the electronic device displays the visual code, displaying an image sensor activation user interface in the three-dimensional environment, and receiving a first input at the image sensor activation user interface.

Optionally, displaying the image sensor data from the image sensor comprises displaying the image sensor data at a location within the three-dimensional environment corresponding to display of the electronic device.

Optionally, displaying the received image sensor data from the image sensor comprises displaying the image sensor data at a pre-determined location within the three-dimensional environment.

Optionally, displaying the image sensor data from the image sensor in the three-dimensional environment comprises displaying the image sensor data from the image sensor at a first location within the three-dimensional environment, and wherein the method further comprises: while displaying the image sensor data from the image sensor at the first location within the three-dimensional environment, receiving a first input from a first portion of the user including a first air gesture directed to the displayed image sensor data followed by movement of the first portion of the user, and in response to receiving the first input, updating the location of the displayed image sensor data in the three-dimensional environment in accordance with the detected movement of the first portion of the user, wherein the updated location of the displayed image sensor data is a second location, different from the first location within the three-dimensional environment.

Optionally, displaying the image sensor data from the image sensor in the three-dimensional environment comprises displaying the image sensor data from the image sensor according to a first size in the three-dimensional environment, and wherein the method further comprises: while displaying the image sensor data from the image sensor according to the first size in the three-dimensional environment, receiving a first input from a first portion of the user, including a first air gesture directed to the displayed image sensor data followed by movement of the first portion of the user, and in response to receiving the first input, updating the size of the displayed image sensor data in accordance with the detected movement of the first portion of the user, wherein the updated size of the displayed image sensor data is a second size, different from the first size.

Optionally, the communication link is a direct communication link to the image sensor.

Optionally, the communication link is an indirect communication link via the electronic device.

According to the above, some examples of the disclosure are directed to a method comprising: at a computer system in communication with one or more displays and one or more input devices: while presenting, via the one or more displays, a three-dimensional environment, wherein the three-dimensional environment includes a first pre-defined location within the three-dimensional environment, receiving an indication to display image sensor data from a first image sensor at the first pre-defined location within the three-dimensional environment, in response to receiving the indication to display image sensor data from the first image sensor at the first pre-defined location, generating a communication link to the first image sensor, receiving the image sensor data from the first image sensor via the communication link, and displaying, via the one or more displays, the image sensor data from the first image sensor at the first pre-defined location within in the three-dimensional environment.

Optionally, receiving the indication to display image sensor data from the first image sensor of the one or more image sensors comprises: while presenting the three-dimensional environment including the first pre-defined location, displaying an image sensor connection user interface at the pre-defined location within the three-dimensional environment, receiving a first input at the image sensor connection user interface to display image sensor data at the pre-defined location, in response to receiving the first input at the image sensor connection user interface, displaying an image sensor selection user interface for selecting one of one or more pre image sensors, and while displaying the image sensor selection user interface, receiving, a second input corresponding to a selection of the first image sensor of the one or more image sensors.

Optionally, the method further comprises: while displaying the received image sensor data from the image sensor at the first predefined location within the three-dimensional environment, receiving a first input from a first portion of the user including a first air gesture directed to the displayed image sensor data followed by movement of the first portion of the user, and in response to receiving the first input, updating the location of the displayed image sensor data in the three-dimensional environment in accordance with the detected movement of the first portion of the user, wherein the updated location of the displayed image sensor data is a second location, different from the first pre-defined location within the three-dimensional environment.

Optionally, the received indication to display image sensor data from the first image sensor at the first pre-defined location includes receiving internet protocol information for accessing the image sensor data from the first image sensor.

Optionally, the received indication to display image sensor data from the first image sensor at the first pre-defined location includes receiving one or more of resolution information and aspect ratio information for displaying the image sensor data from the first image sensor.

Optionally, displaying the image sensor data from the image sensor in the three-dimensional environment comprises displaying the image sensor data from the image sensor according to a first size in the three-dimensional environment, and wherein the method further comprises: while displaying the received image sensor data from the image sensor according to the first size in the three-dimensional environment, receiving a first input from a first portion of the user including a first air gesture directed to the displayed image sensor data followed by movement of the first portion of the user, and in response to receiving the first input, updating the size of the displayed image sensor data in accordance with the detected movement of the first portion of the user, wherein the updated size of the displayed image sensor data is a second size, different from the first size.

Optionally, the pre-defined area in the three-dimensional environment corresponds to a representation of an electronic device with a display in the three-dimensional environment.

Optionally, displaying the image sensor data from the first image sensor comprises displaying the image sensor data at a location within the three-dimensional environment corresponding to the display of the electronic device.

Optionally, the communication link is a direct communication link to the image sensor.

Optionally, the communication link is an indirect communication link via the electronic device.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

What is claimed is:

1. A method comprising:
   at a computer system in communication with one or more displays and one or more input devices:
   while presenting, via the one or more displays, a three-dimensional environment including an electronic device with a display, wherein the electronic device is communicatively coupled to an image sensor, receiving an indication to display image sensor data from the image sensor that is communicatively coupled to the electronic device;

in response to receiving an indication to display image sensor data from the image sensor that is communicatively coupled to the electronic device, establishing a communication link to the image sensor communicatively coupled to the electronic device;

receiving image sensor data from the image sensor via the communication link; and displaying the image sensor data from the image sensor in the three-dimensional environment.

2. The method of claim 1, wherein receiving the indication to display image sensor data from the image sensor that is communicatively coupled to the electronic device comprises detecting that a user of the computer system is gazing at the display of the electronic device while the display of the electronic device displays a visual code.

3. The method of claim 2, wherein the visual code includes information pertaining to the display of the electronic device comprising one or more of screen resolution information, size information, or location of display information of the electronic device.

4. The method of claim 2, wherein receiving the indication to display image sensor data from the image sensor that is communicatively coupled to the electronic device further comprises:

in response to detecting that the user of the computer system is gazing at the display of the electronic device while the display of the electronic device displays the visual code, displaying an image sensor activation user interface in the three-dimensional environment; and receiving a first input at the image sensor activation user interface.

5. The method of claim 1, wherein displaying the image sensor data from the image sensor comprises displaying the image sensor data at a location within the three-dimensional environment corresponding to display of the electronic device.

6. The method of claim 1, wherein displaying the received image sensor data from the image sensor comprises displaying the image sensor data at a pre-determined location within the three-dimensional environment.

7. The method of claim 1, wherein displaying the image sensor data from the image sensor in the three-dimensional environment comprises displaying the image sensor data from the image sensor at a first location within the three-dimensional environment, and wherein the method further comprises:

while displaying the image sensor data from the image sensor at the first location within the three-dimensional environment, receiving a first input from a first portion of a user of the computer system including a first air gesture directed to the displayed image sensor data followed by movement of the first portion of the user; and in response to receiving the first input, updating the location of the displayed image sensor data in the three-dimensional environment in accordance with a detected movement of the first portion of the user, wherein the updated location of the displayed image sensor data is a second location, different from the first location within the three-dimensional environment.

8. The method of claim 1, wherein displaying the image sensor data from the image sensor in the three-dimensional environment comprises displaying the image sensor data from the image sensor according to a first size in the three-dimensional environment, and wherein the method further comprises:

while displaying the image sensor data from the image sensor according to the first size in the three-dimensional environment, receiving a first input from a first portion of a user, including a first air gesture directed to the displayed image sensor data followed by movement of the first portion of the user; and in response to receiving the first input, updating the size of the displayed image sensor data in accordance with the detected movement of the first portion of a user, wherein the updated size of the displayed image sensor data is a second size, different from the first size.

9. A computer system that is in communication with a display generation component and one or more input devices, the computer system comprising:

one or more processors;

memory; and one or more programs, wherein the one or more programs are stored in the memory and configured to be executed by the one or more processors, the one or more programs including instructions for:

while presenting, via one or more displays, a three-dimensional environment including an electronic device with a display, wherein the electronic device is communicatively coupled to an image sensor, receiving an indication to display image sensor data from the image sensor that is communicatively coupled to the electronic device;

in response to receiving an indication to display image sensor data from the image sensor that is communicatively coupled to the electronic device, establishing a communication link to the image sensor communicatively coupled to the electronic device;

receiving image sensor data from the image sensor via the communication link; and displaying the image sensor data from the image sensor in the three-dimensional environment.

10. The computer system of claim 9, wherein receiving the indication to display image sensor data from the image sensor that is communicatively coupled to the electronic device comprises detecting that a user of the computer system is gazing at the display of the electronic device while the display of the electronic device displays a visual code.

11. The computer system of claim 10, wherein the visual code includes information pertaining to the display of the electronic device comprising one or more of screen resolution information, size information, or location of display information of the electronic device.

12. The computer system of claim 10, wherein receiving the indication to display image sensor data from the image sensor that is communicatively coupled to the electronic device further comprises:

in response to detecting that the user of the computer system is gazing at the display of the electronic device while the display of the electronic device displays the visual code, displaying an image sensor activation user interface in the three-dimensional environment; and receiving a first input at the image sensor activation user interface.

13. The computer system of claim 9, wherein displaying the image sensor data from the image sensor comprises displaying the image sensor data at a location within the three-dimensional environment corresponding to display of the electronic device.

14. The computer system of claim 9, wherein displaying the received image sensor data from the image sensor comprises displaying the image sensor data at a pre-determined location within the three-dimensional environment.

15. The computer system of claim 9, wherein displaying the image sensor data from the image sensor in the three-dimensional environment comprises displaying the image sensor data from the image sensor at a first location within the three-dimensional environment, and wherein the one or more programs further include instructions for:

while displaying the image sensor data from the image sensor at the first location within the three-dimensional environment, receiving a first input from a first portion of a user including a first air gesture directed to the displayed image sensor data followed by movement of the first portion of the user; and in response to receiving the first input, updating the location of the displayed image sensor data in the three-dimensional environment in accordance with the detected movement of the first portion of the user, wherein the updated location of the displayed image sensor data is a second location, different from the first location within the three-dimensional environment.

16. The computer system of claim 9, wherein displaying the image sensor data from the image sensor in the three-dimensional environment comprises displaying the image sensor data from the image sensor according to a first size in the three-dimensional environment, and wherein the one or more programs further include instructions for:

while displaying the image sensor data from the image sensor according to the first size in the three-dimensional environment, receiving a first input from a first portion of a user, including a first air gesture directed to the displayed image sensor data followed by movement of the first portion of the user; and in response to receiving the first input, updating the size of the displayed image sensor data in accordance with the detected movement of the first portion of the user, wherein the updated size of the displayed image sensor data is a second size, different from the first size.

17. A non-transitory computer readable storage medium storing one or more programs, the one or more programs comprising instructions, which when executed by one or more processors of a computer system, cause the computer system to perform a method comprising:

while presenting, via one or more displays of the computer system, a three-dimensional environment including an electronic device with a display, wherein the electronic device is communicatively coupled to an image sensor, receiving an indication to display image sensor data from the image sensor that is communicatively coupled to the electronic device;

in response to receiving an indication to display image sensor data from the image sensor that is communicatively coupled to the electronic device, establishing a communication link to the image sensor communicatively coupled to the electronic device;

receiving image sensor data from the image sensor via the communication link; and displaying the image sensor data from the image sensor in the three-dimensional environment.

18. The non-transitory computer readable storage medium of claim 17, wherein receiving the indication to display image sensor data from the image sensor that is communicatively coupled to the electronic device comprises detecting that a user of the computer system is gazing at the display of the electronic device while the display of the electronic device displays a visual code.

19. The non-transitory computer readable storage medium of claim 18, wherein the visual code includes information pertaining to the display of the electronic device comprising one or more of screen resolution information, size information, or location of display information of the electronic device.

20. The non-transitory computer readable storage medium of claim 18, wherein receiving the indication to display image sensor data from the image sensor that is communicatively coupled to the electronic device further comprises:

in response to detecting that the user of the computer system is gazing at the display of the electronic device while the display of the electronic device displays the visual code, displaying an image sensor activation user interface in the three-dimensional environment; and receiving a first input at the image sensor activation user interface.

21. The non-transitory computer readable storage medium of claim 17, wherein displaying the image sensor data from the image sensor comprises displaying the image sensor data at a location within the three-dimensional environment corresponding to the display of the electronic device.

22. The non-transitory computer readable storage medium of claim 17, wherein displaying the received image sensor data from the image sensor comprises displaying the image sensor data at a pre-determined location within the three-dimensional environment.

23. The non-transitory computer readable storage medium of claim 17, wherein displaying the image sensor data from the image sensor in the three-dimensional environment comprises displaying the image sensor data from the image sensor at a first location within the three-dimensional environment, and wherein the one or more programs further comprise instructions for:

while displaying the image sensor data from the image sensor at the first location within the three-dimensional environment, receiving a first input from a first portion of a user including a first air gesture directed to the displayed image sensor data followed by movement of the first portion of the user; and in response to receiving the first input, updating the location of the displayed image sensor data in the three-dimensional environment in accordance with the detected movement of the first portion of the user, wherein the updated location of the displayed image sensor data is a second location, different from the first location within the three-dimensional environment.

24. The non-transitory computer readable storage medium of claim 17, wherein displaying the image sensor data from the image sensor in the three-dimensional environment comprises displaying the image sensor data from the image sensor according to a first size in the three-dimensional environment, and the one or more programs further comprise instructions for:

while displaying the image sensor data from the image sensor according to the first size in the three-dimensional environment, receiving a first input from a first portion of a user, including a first air gesture directed to the displayed image sensor data followed by movement of the first portion of the user; and in response to receiving the first input, updating the size of the displayed image sensor data in accordance with the detected movement of the first portion of the user, wherein the updated size of the displayed image sensor data is a second size, different from the first size.

* * * * *